April 3, 1945. R. E. PAGE ET AL 2,372,909
CARD PUNCHING MACHINE
Filed Dec. 29, 1943 12 Sheets-Sheet 7
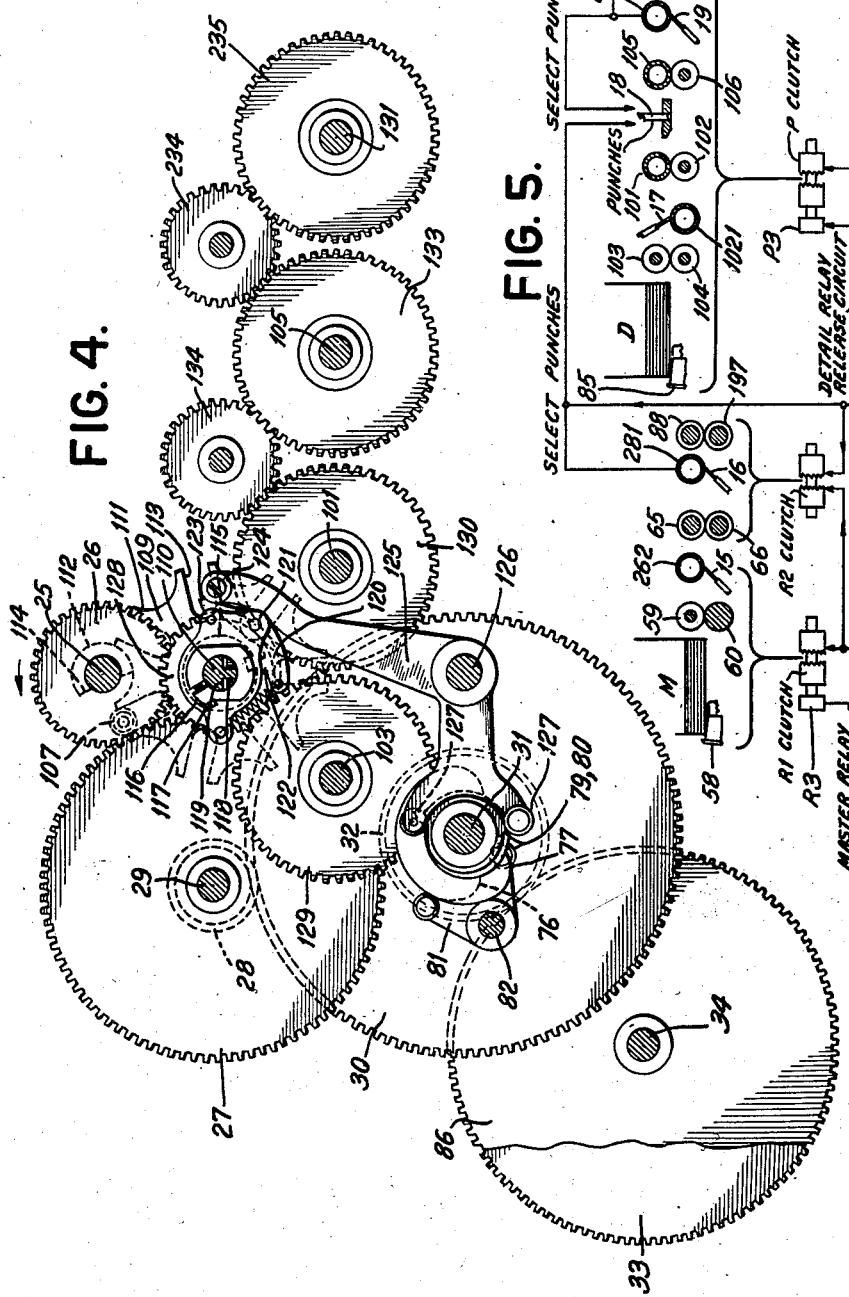
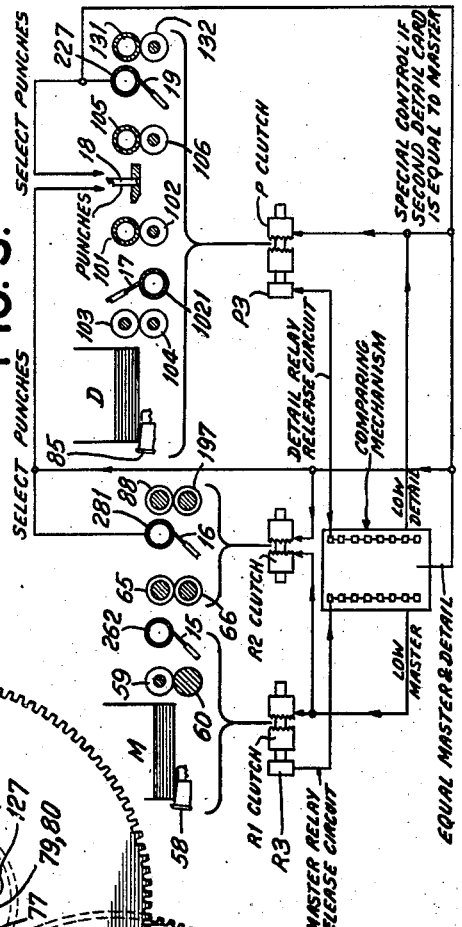
INVENTORS
Ralph E. Page
Horace S. Beattie
BY
ATTORNEY

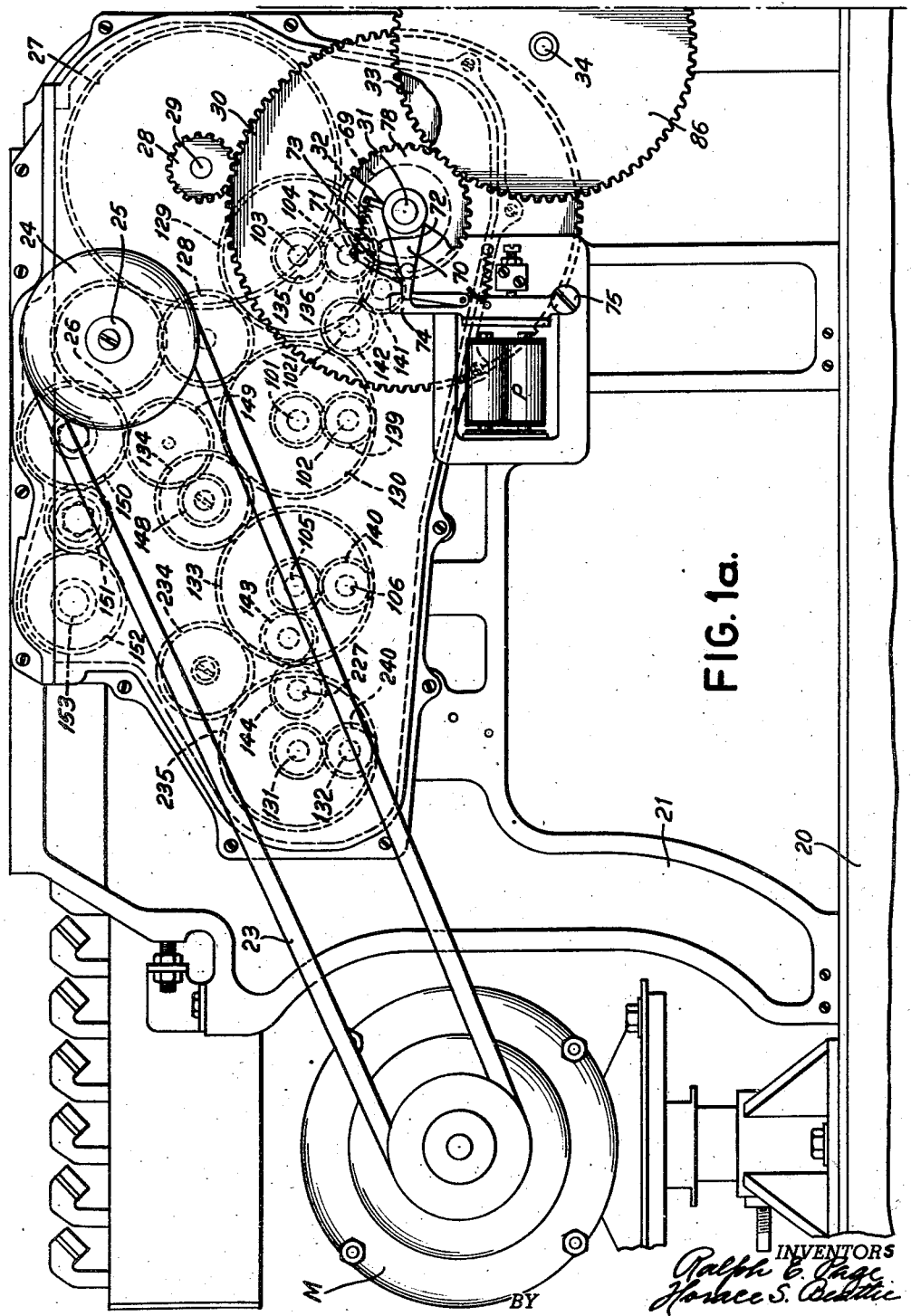

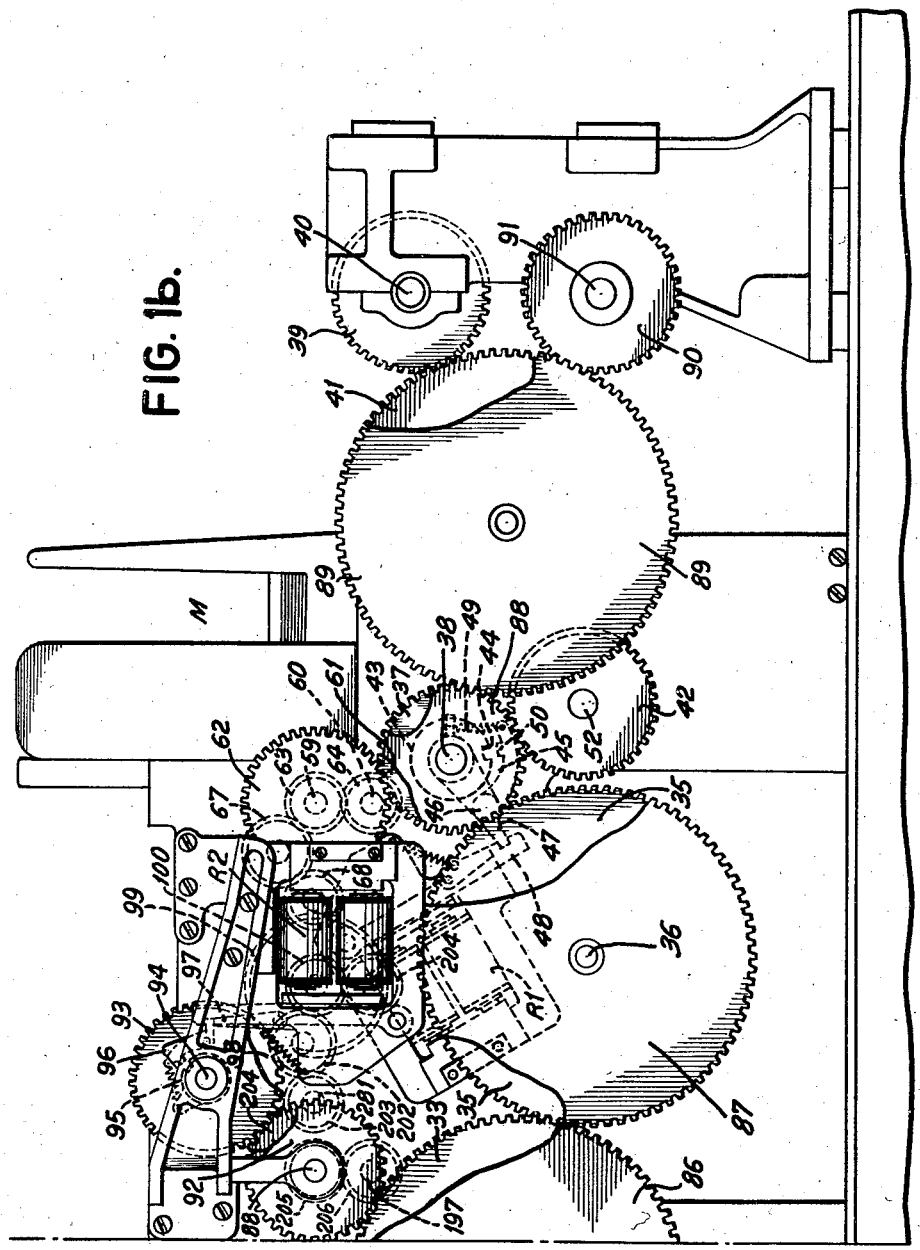

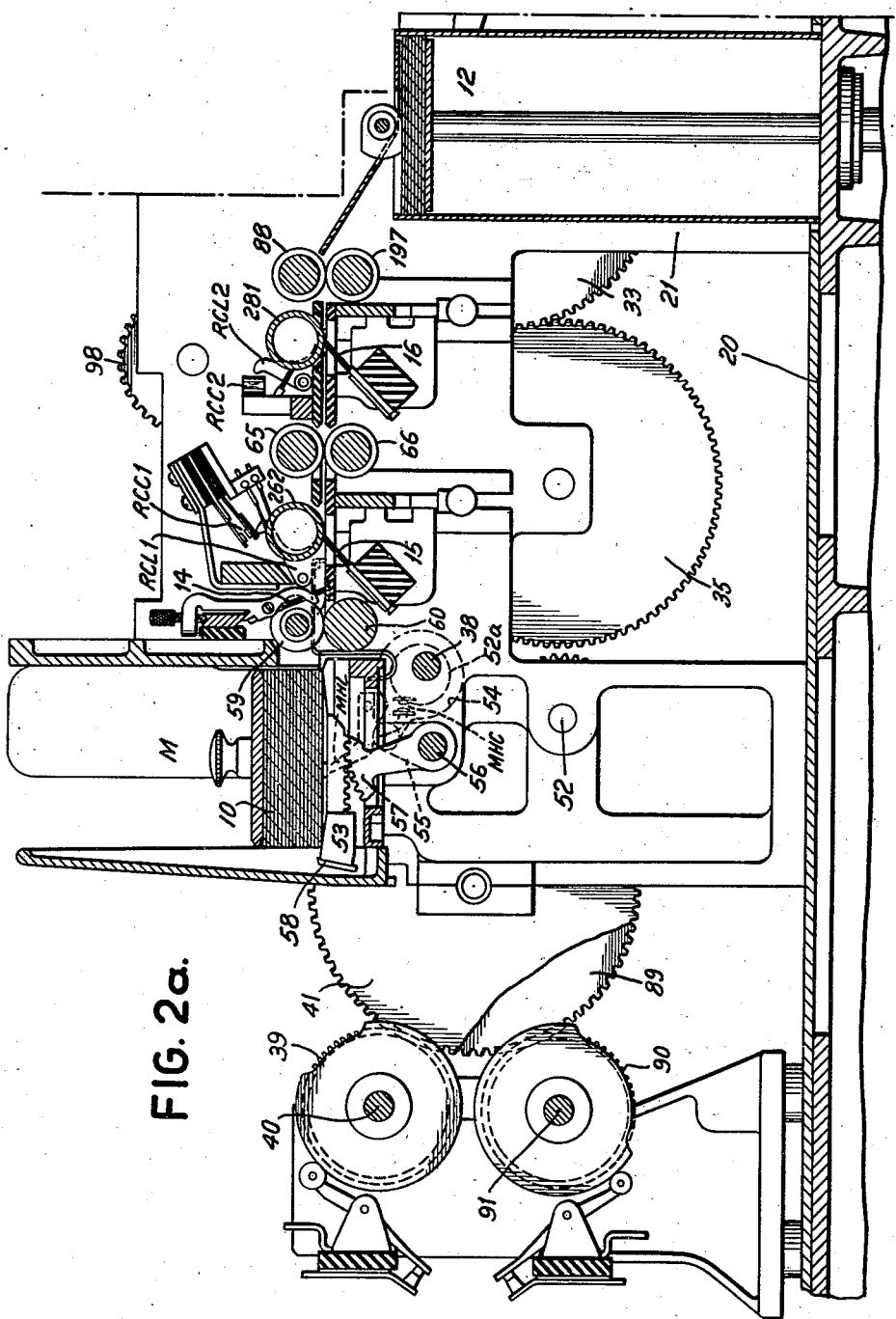

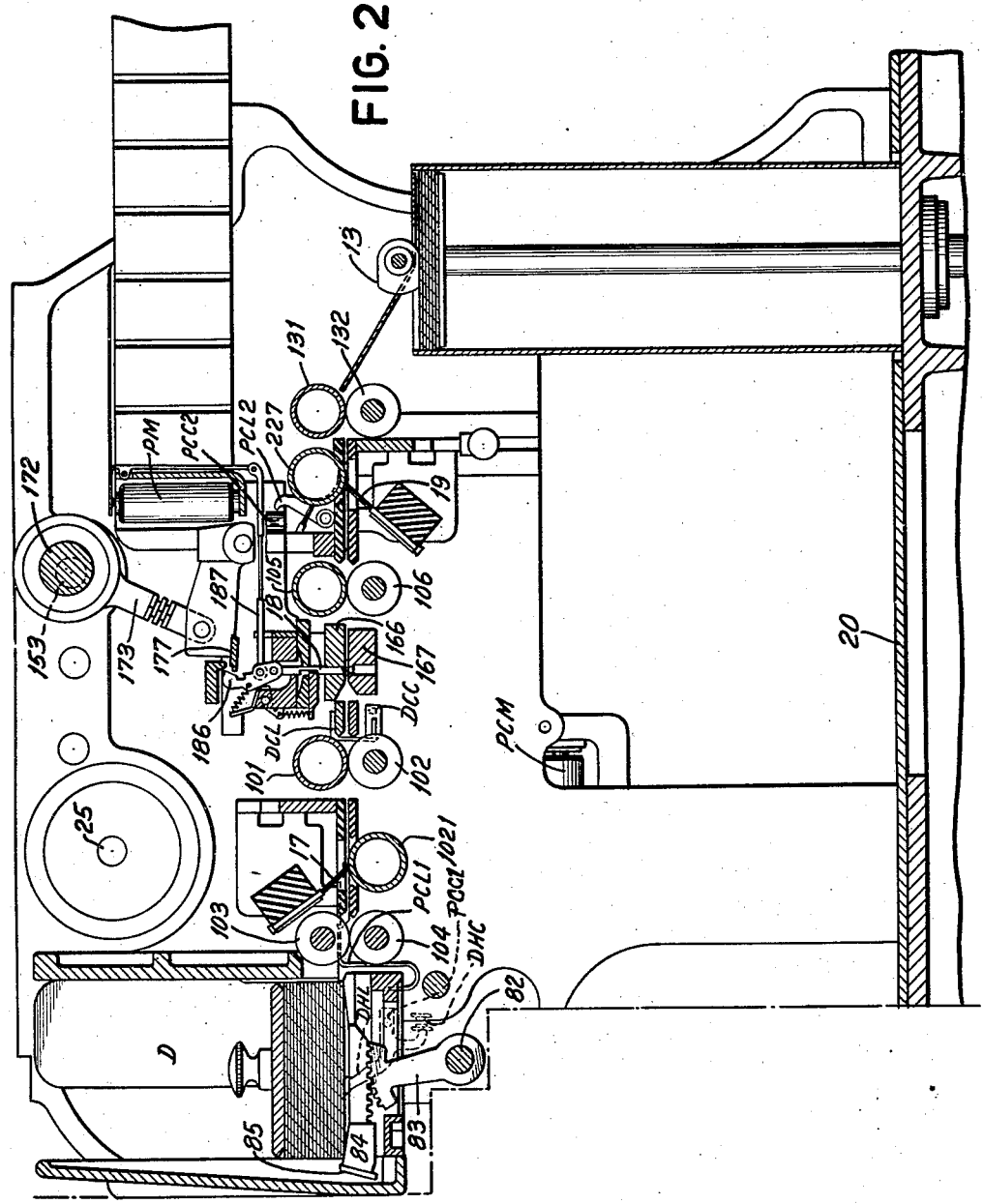

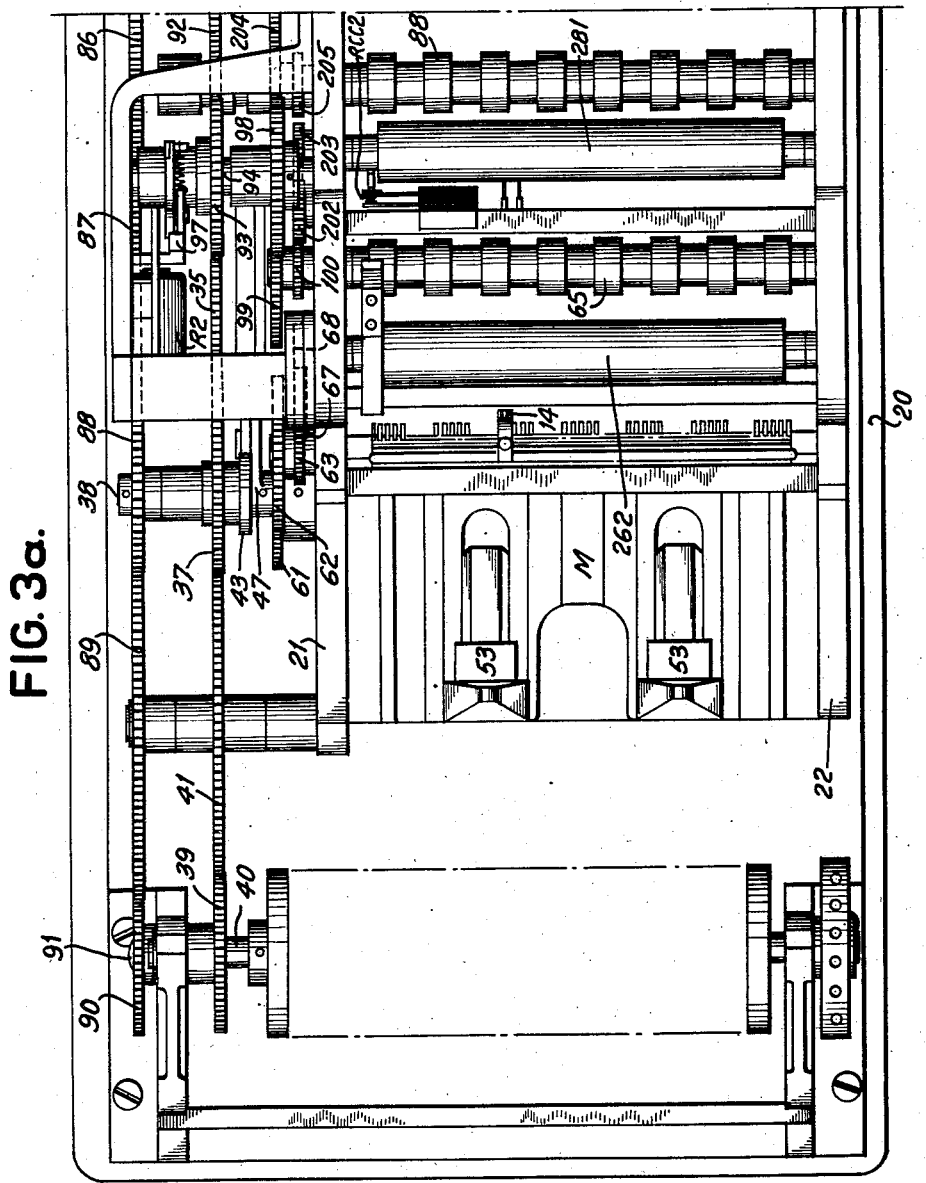

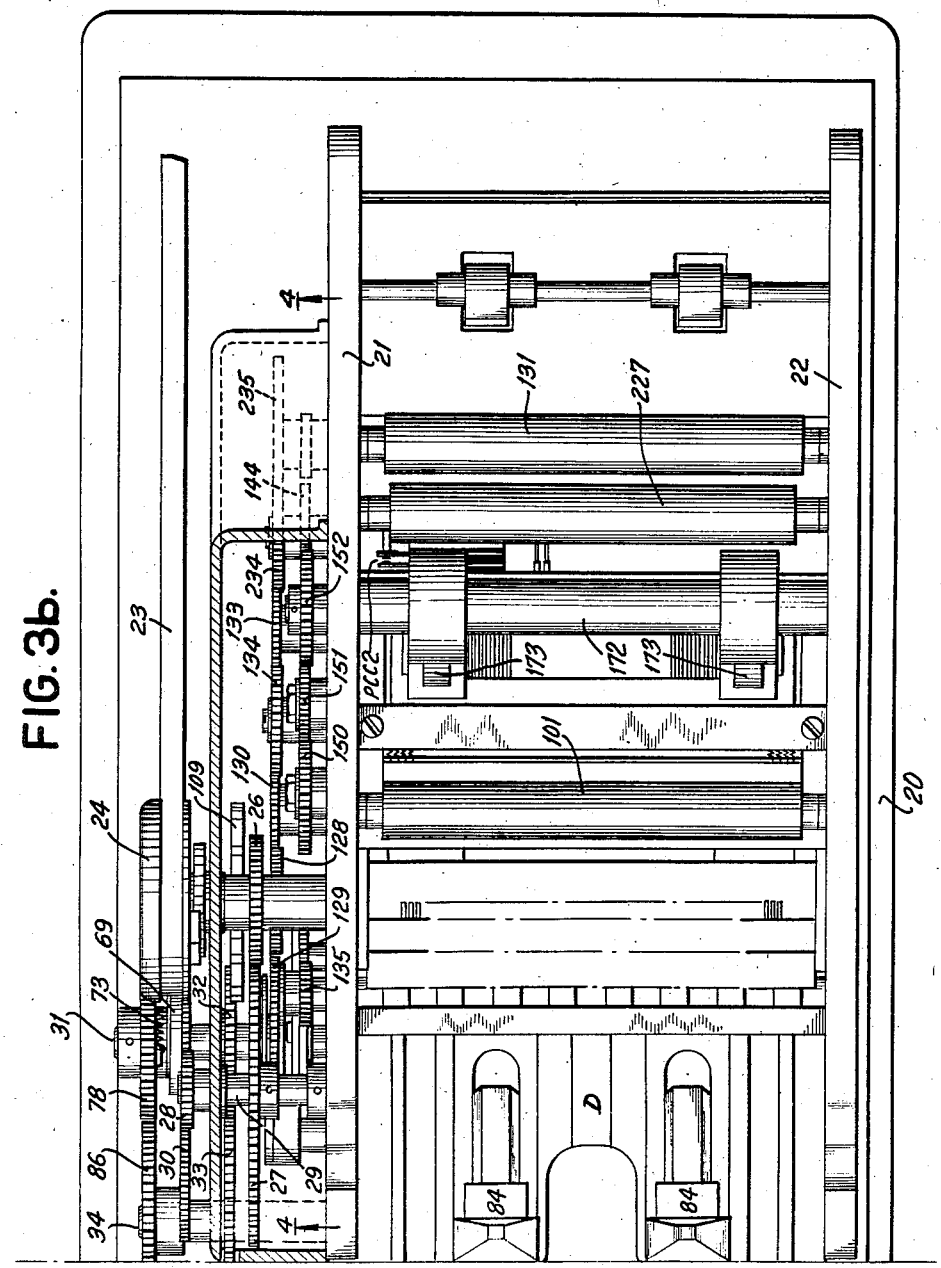

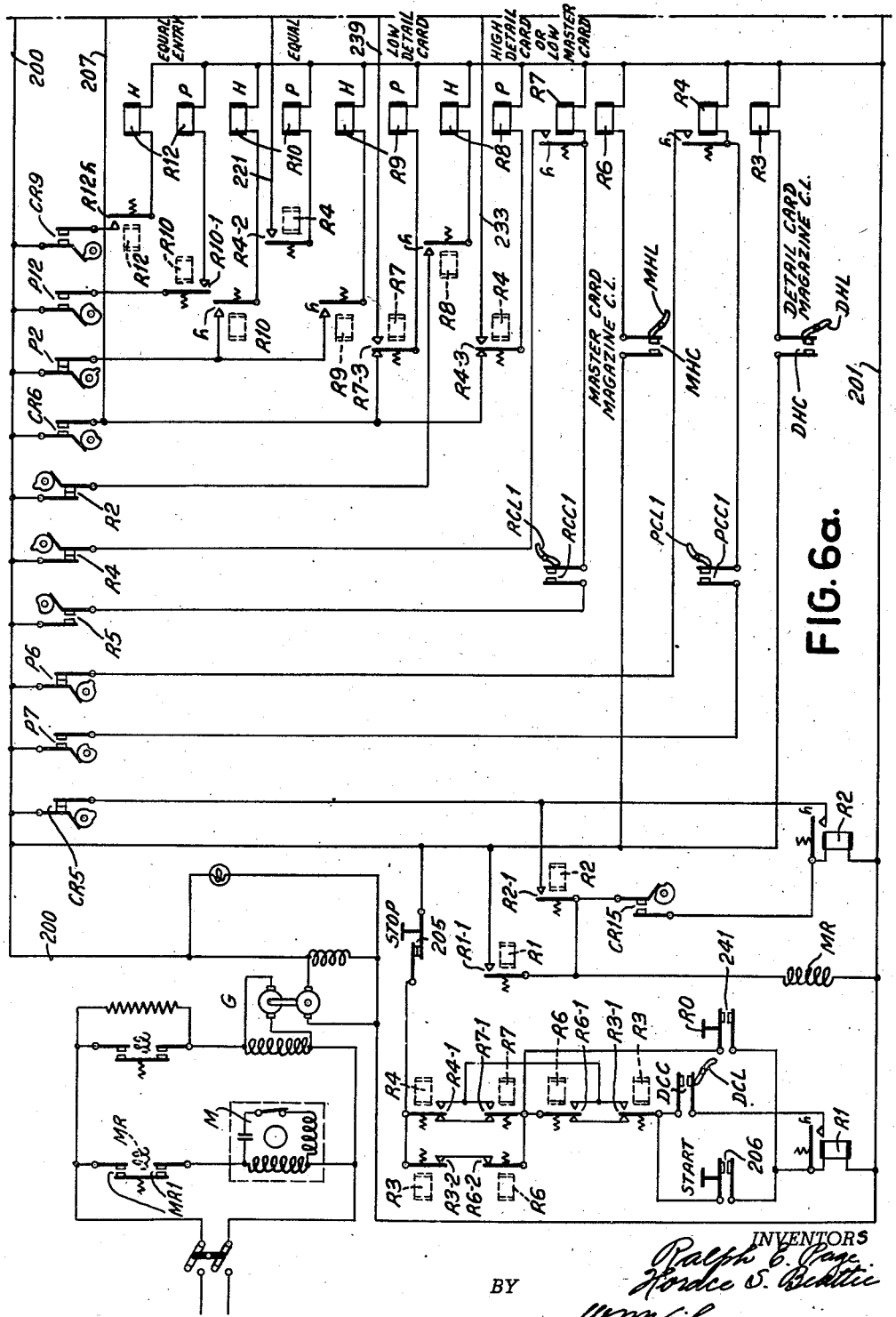

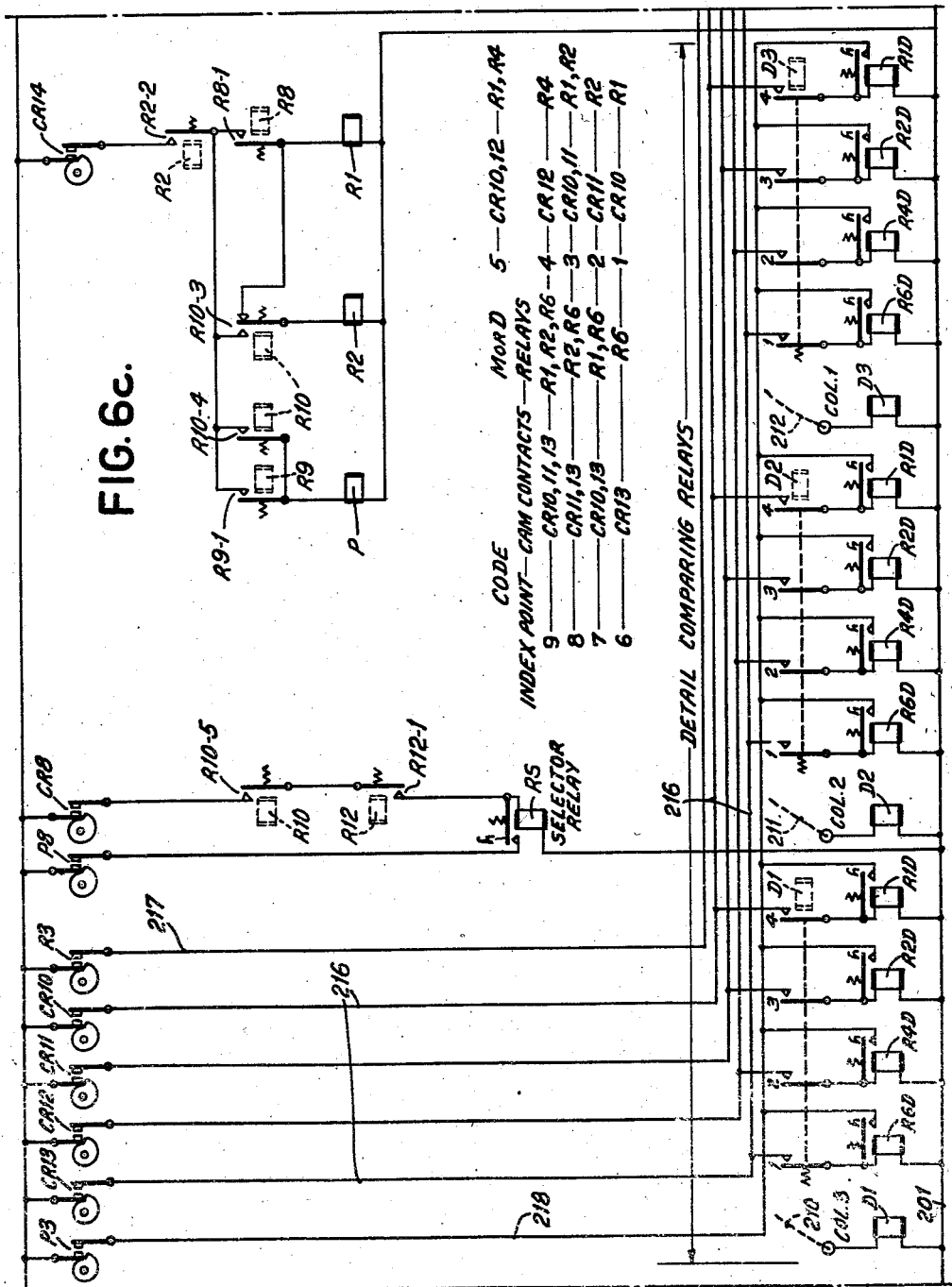

April 3, 1945. R. E. PAGE ET AL 2,372,909
CARD PUNCHING MACHINE
Filed Dec. 29, 1943 12 Sheets-Sheet 11
FIG. 6d.
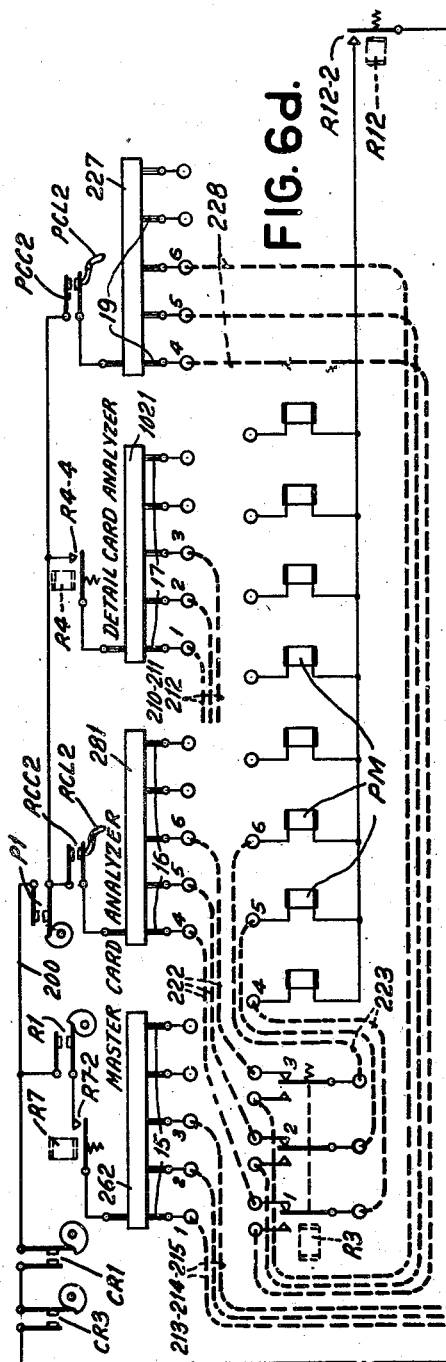
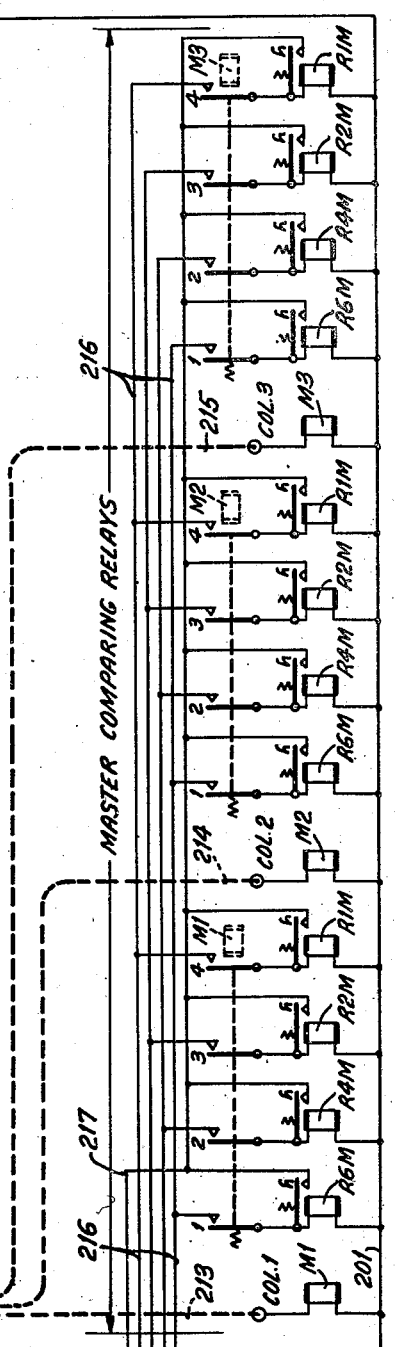
INVENTORS
Ralph E. Page
Horace S. Beattie
BY
W. M. Wilson ATTORNEY Patented Apr. 3, 1945

2,372,909

UNITED STATES PATENT OFFICE 2,372,909

CARD PUNCHING MACHINE

Ralph E. Page, West Orange, and Horace S. Beattie, East Orange, N. J., assignors to International Business Machines Corporation, New York, N. Y., a corporation of New York Application December 29, 1943, Serial No. 516,048

37 Claims. (Cl. 164—115)

This invention relates to punching machines and more particularly to the card controlled type which provides for selective punching of data on one card which is taken or transferred from another card.

The object of the invention is to provide an improved arrangement which provides for the analysis of master and detail cards and the transfer of data from the master card to the detail card whenever a particular relationship is determined, and preferably when equality in classification designation is located between a master card and a detail card.

A still further object of the invention is to provide for the selective feeding of either master or detail cards when the relative numerical value of one is lower than the other until a pair of cards is analyzed which is found to be numerically equal in classification designation.

Another object of the invention is to initiate the operation of the punching mechanism and the feeding of a detail card past the punches so that by setting the punch selectors under control of the master card as the latter is analyzed, punching of the detail card will be effected as the latter is moved past the punches.

Another object of the present invention is to provide a machine of the class described with comparing mechanism which is capable of determining not only equality in numerical value but which is capable of detecting whether a master or detail card is lower in numerical value and, upon the detection of such inequality, causing the feeding of cards containing a representation of the lower numerical value until equality is again reached, if such condition can be obtained.

A still further object of the invention is to provide a maintained digit setup of the compared numerical value of either the master or detail card until the feeding of the related card from a magazine or hopper is initiated. This setup is retained for the purpose of comparison with the numerical values of the cards which are found to be lower in numerical value and which are being analyzed as they are fed from the other magazine.

A still further object of the invention is to provide the punching of the first detail card under control of the master card, which is found to be numerically equal but for causing the punching of each following equal detail card under control of the preceding detail card which has received the transferred punched data.

The present invention is particularly useful in card controlled accounting systems involving the use of master and detail cards. There is, generally speaking, one or more detail cards for each master card but due to the absence of current accounts or for other reasons, there may be some detail cards without accompanying master cards and vice versa. In passing the stack of master and detail cards through a sorting machine of a conventional design, the related stack of master and detail cards are preferably sorted in ascending numerical sequence and in such relationship the master and detail cards are placed in the supply magazines of the present machine.

To make the operation of the present machine somewhat clearer, it will be assumed that the cards are located in the respective hoppers in the following numerical order:

| Master cards | Detail cards |
|---|---|
| 15 | 12 |
| 16 | 13 |
| 17 | 14 |
| 21 | 15 |
| 22 | 15 |
| 23 | 15 |
| 24 | 15 |
|  | 24 |

In passing the first master card 15 and the detail card 12 through the machine, inequality is determined by the comparing mechanism and as a result of the comparison the detail card is found to be lower in numerical value than the first analyzed master card, and successive feeding of the detail cards continues to pass the detail cards 12, 13, 14 through the machine until detail card numbered 15 is analyzed. In the absence of feeding of the master cards the numerical value 15 derived from the master card numbered 15 is retained set up on the comparing mechanism and being compared concurrently with the detail card numbered 15 equality is located. The mode of operation of the machine then changes and punching is effected from the first detail card under control of the master card as the latter is now being fed past by its related analyzing brushes. At the same time the detail card passes by the punches to receive data transposed from the master card. With this digit setup of the master card still retained there will be a comparison with the three successively fed detail cards but transferred of the numerical data on these following cards is derived from the preceding detail card rather than from the master card as in the case for punching the first detail card having equality. A point is then reached in the machine in which detail card 24 is analyzed and which is found to be numerically greater than the digit set up for the master card 15 and this inequality determines that the detail card 24 is greater in numerical value than the master card 15 or, in other words, the master card 15 is numerically less than the detail card 24. The master card now being on the low side there will be a successive feeding of the master cards 15, 16, 17, 21, 22, 23 until the master card 24 is analyzed and compared with the maintained digit set up for the detail card 24. Equality is then determined and there is then a transference of numerical data on the master card to the detail card.

The above example brings in the various modes of operation of the machine effected in accordance with the relative numerical values of the master and detail cards and shows the manner in which the desired results are brought about.

Of course, the terms "master" and "detail" are merely illustrative and are not to be considered as restrictive in the particular type of card used to control the machine. The present invention may find application in other card controlled accounting systems where the same general results are desired and the mechanisms may be varied in one or more ways to secure equivalent results.

Other objects of the invention will be pointed out in the following description and claims and illustrated in the accompanying drawings, which disclose, by way of example, the principle of the invention and the best mode, which has been contemplated, of applying that principle.

In said drawings:

Figs. 1a and 1b when assembled in the order named show a side elevation of the machine.

Figs. 2a and 2b when assembled in the order named comprise a longitudinal sectional view of the machine.

Figs. 3a and 3b when assembled in the order named show a plan view of the machine.

Fig. 4 is a sectional view showing a portion of the driving mechanism including the Geneva step motion gear.

Fig. 5 is a diagrammatic view showing the particular card feeding mechanism associated with each of the selectively engaged clutches and the manner in which the mode of operation of the machine is controlled from the results of the comparing mechanism.

Figs. 6a, 6b, 6c and 6d when assembled in the order named show the electrical wiring connections for the machine.

Figure 7:
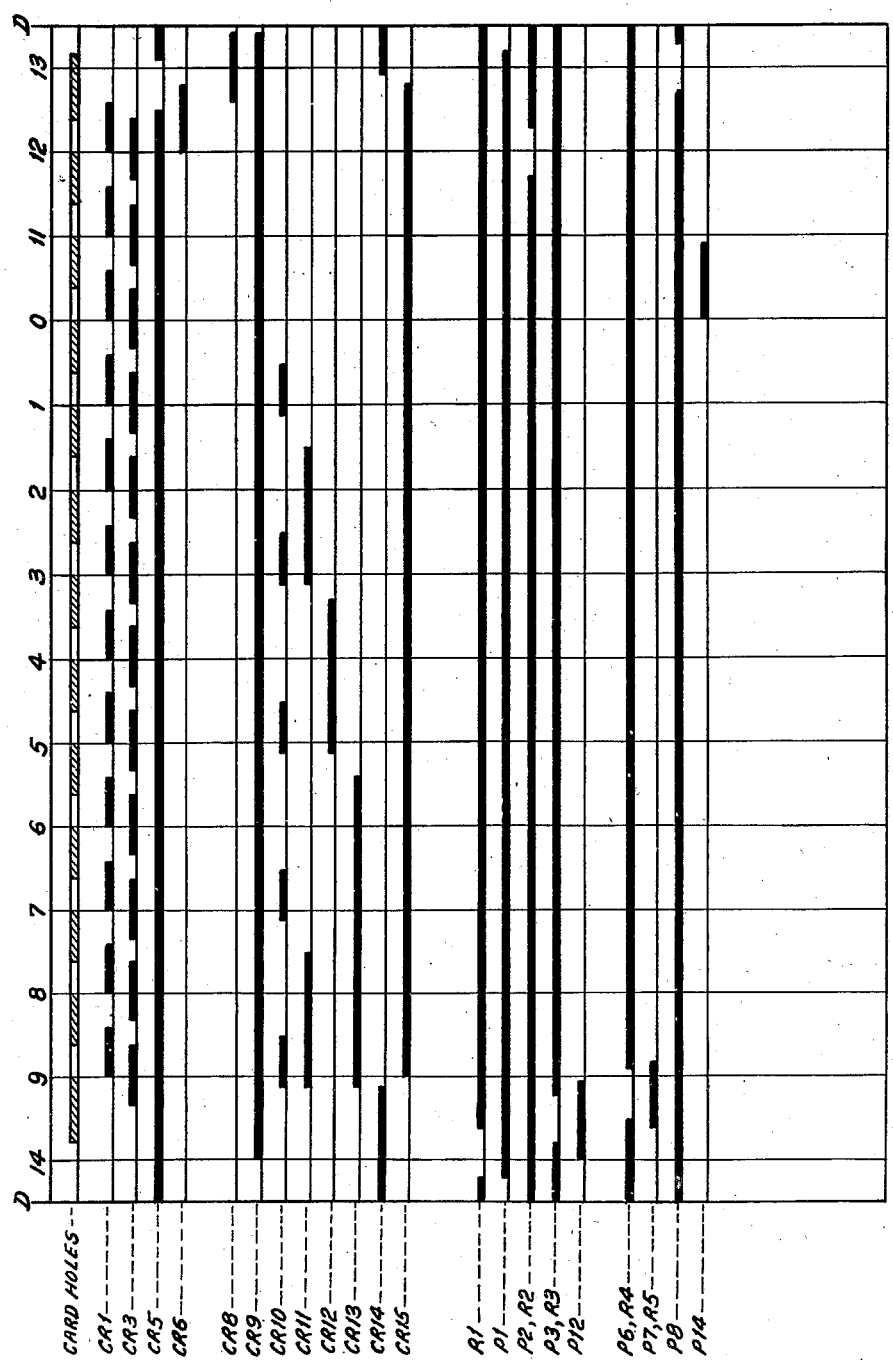

Fig. 7 is a timing diagram showing the timing of the cam operated contacts.

The present improvements are preferably incorporated in the form of card perforating machine fully shown and described in the patent to C. D. Lake, No. 2,032,805, dated March 3, 1936.

In the following description a general description will be given of the construction and operation of the machine as far as it pertains to the present invention so that the operation thereof can be better understood without reference to the patent.

Where structural changes and operations are made, a detail description is given herein in order to understand the incorporation of the present improvements in the patented machine.

To obtain further details of construction and operation of the illustrative machine, reference may be had to the aforementioned patent.

The power for operating the machine is obtained from a motor M (Fig. 1a) which is mounted above the base 20 of the machine, which base carries a pair of main side frames 21 and 22. (See Figs. 3a and 3b.)

The motor is connected by a drive belt 23 (Figs. 1a and 3b) to a pulley 24 on a shaft 25 (Fig. 4). Fixed to the shaft 25 is a gear 26 which serves to drive the continuously running devices of the machine.

A speed reduction gearing is inserted between the gear 26 and the card feeding mechanism for the detail and master cards and comprises the gear 26 which meshes with a larger gear 27 to which is attached a smaller gear 28, both being secured to a shaft 29. The smaller gear 28 meshes with a larger driving gear 30 which is loosely pivoted on a detail card feed and punch drive shaft 31 and attached to the gear 30 is a gear 32 (see Fig. 1a).

Gear connections are provided between the constantly running drive shafts and a clutch mechanism for feeding master cards from hopper M and another clutch for feeding detail cards from the hopper D, so that cards may be fed in synchronism from both hoppers when cards are to be fed in pairs, or from the hoppers M or D when a single card is to be fed at a time.

The gear 32 (Fig. 1a) meshes with a larger gear 33 pivoted on a shaft 34. The constantly running gear 33 in turn meshes with a gear 35 (see Fig. 1b) loosely pivoted on a shaft 36. Gear 35 meshes with a constantly running clutch driving gear 37 loose on shaft 38. The gear 37 through idler gear 41 drives a gear 39 attached to a shaft 40. Thus, shaft 40 is continuously rotated and it is used for carrying cams which operate cam contacts designated by CR1—CR15, to be mentioned hereafter.

Attached to the gear 37 is a clutch disk 43 (Fig. 1b) provided with a clutch notch 44. Cooperating with the clutch notch 44 is a clutch pawl 45 mounted on a stud 46 carried by an arm 47 (Fig. 3a) attached to the drive shaft 38. One end of the pawl is engaged by an armature latch 48 and the other end of the pawl is formed with an extension 50 (Fig. 1b) and the pawl is urged by a spring 49 to engage the clutch notch 44. When the associated clutch control magnet R1 is energized the armature latch 48 is attracted to release the clutch pawl 45 which thereupon moves to clutch engaging position and connects the driving gear 37 with the drive shaft 38 for feeding the master cards from hopper M. The above describes a well known form of one-revolution clutch, the purpose of which is to effect a single revolution of the drive shaft 38 to perform a number of functions.

The shaft 38 is provided with an eccentric 52a (Fig. 2a) for operating card feed picker slides 53. Encircling the eccentric is a strap 54 which receives a reciprocating motion for each rotation of the drive shaft 38. The strap 54 is formed with an ear pivotally attached to an arm 55 attached to a shaft 56 secured to which is a pair of gear sectors 57. The sectors mesh with teeth formed at the bottom of picker slides 53 and the latter carry a picker knife 58 adapted to engage the bottom master card in the hopper M and feed the same to the first set of feeding rollers 59—60 which are concurrently rotated when the R1 clutch is engaged.

It is apparent from the described clutch connections that when the clutch control magnet R1 is energized the picker knife 58 is moved to the right, bringing the bottom master card in the hopper M over into cooperation with the feeding rollers 59—60. Such feeding action for the hopper or magazine M ensues for each engagement of the R1 clutch.

The feeding rollers 59—60 are driven by a gear 61 (Fig. 1b) attached to shaft 38 and which gear 61 is in mesh with a gear 62 on the roller 59. A smaller gear 63 on roller 59 cooperates with a similar gear 64 on roller 60 so that both rollers are turned simultaneously but oppositely. The rollers extend across the machine between the side frames and when the rollers turn they draw a master card from the hopper or magazine M and feed it to the right (Fig. 2a) between a contact roller 262 and analyzing brushes 15 and between other feed rollers 65 and 66, the driving of which is described hereinafter as controlled by a separate clutch.

The contact roller 262 associated with brushes 15 is driven by gear connections from feed roller 59 shown in Fig. 1b. The gear 63 on roller 59 meshes with an idler gear 67 which in turn meshes with a gear 68 on contact roller 262.

The gear 61 meshes with a gear 42 (Fig. 1b) secured to a shaft 52 which shaft carries the cams for operating cam contacts R2, R3, R4 and R5, whenever the R1 clutch is engaged.

The P clutch mechanism for feeding detail cards from the D hopper and concurrently effecting punching is operated when clutch connections are established between the shaft 31 (Figs. 1a and 4) and the constantly rotating gear 30. Attached to gear 30 is a clutch disk 69 (Fig. 1a) loose on the shaft 31. Adjacent the clutch disk is an arm 70 secured to shaft 31 and carrying a clutch pawl 71 pivoted thereon. The pawl has a clutch extension adapted to fit into the clutch notch 72 of disk 69 and is urged to this position by a spring 73. However, the pawl is normally held disengaged by a latch 74 which engages an extending arm on the pawl 71. When the clutch magnet P is energized, the armature 74 thereof is attracted. Clutch pawl 71 is now released to engage the notch in the clutch disk 69, thereby connecting shaft 31 to the driving gear 30. By such one-revolution clutch mechanism, shaft 31 is given a complete rotation. When shaft 31 is rotated, three driving devices carried thereon are made effective to actuate various card feeding means. A pair of complementary cams 76—77 secured to shaft 31 (Fig. 4) serves to drive the card picker mechanism. A gear 78 (Figs. 1a and 3b) secured to shaft 31 drives the feeding rollers associated with the hopper D and the P cam contact cams. Another set of complementary cams 79—80 (Fig. 4) secured to shaft 31 acts to release a clutch connection in the Geneva gear drive.

A two-arm lever 81 (Fig. 4) on a rock shaft 82 carries a pair of rollers cooperating with the related cams 76—77. Also attached to the shaft 82 are sector arms 83 (see Fig. 2b) having gear teeth meshing with gear teeth carried by slides on which are mounted picker slides 84. A knife edge 85 attached to the slides 84 is adapted to engage the bottom master card in hopper D and move the card to the right when the picker slide 83 is reciprocated by the cams 76—77 on shaft 31.

Gear 78 (Fig. 1a), which, it will be recalled, is driven a complete revolution when the P clutch is engaged, meshes with a gear 86 mounted on the same stud 34 with gear 33. Gear 86 meshes with a gear 87 (Fig. 1b) loose on the shaft 36. Gear 87 meshes with an idler gear 88 (shown only in Fig. 3a), loose on shaft 38, the latter gear through idler gears 89 and 90 driving a cam carrying shaft 91. Shaft 91 carries the cams for operating the P1—P14 contacts.

There are connections from the driving gear 26 to the series of feeding rollers 103—104, 101—102, 105—106, 131—132 associated with the punching mechanism shown in Fig. 2b for feeding detail cards from the hopper D.

A roller 107 (Fig. 4) extending laterally from the gear 26 forms a means for driving a Geneva step motion gear 109 with an intermittent movement.

The notched Geneva gear wheel 109 turns on a short stud 110 adapted to rotate in frame 21 but is locked in each position by the cooperation of a concentric portion 111 at the end of each radial extension with a hub 112 on shaft 25. The roller 107 moves idly for the greater part of the arc about shaft 25 in a counterclockwise direction (Fig. 4) until it engages in one of the slots 113 in the Geneva gear wheel 109. The gear wheel is then moved with a gradually accelerated and gradually retarded motion which is stopped as the roller 107 moves out of the slot with which it engaged. The gear is released for each step of movement by depression 114 in the side of the hub 112. The depression is presented only when the roller 107 is in position to drive the gear.

As in the patented machine, clutch connection is provided between the Geneva gear wheel 109 and the feeding rollers associated with the punching mechanism (Fig. 2b) so that the step by step feeding may be effected when detail cards are to be fed from hopper D and are to be punched. In Fig. 4 it will be seen that a notched disk 115 is loose on the stud 110 which carries the Geneva wheel 109. Adjacent the disk is a plate 116 which is split at one side where it is clamped to the stud 110 by a screw 117.

The plate 116 is adjustably positioned on the stud 110 by a pair of set screws 118 which are threaded in the plate and extend in cooperation with a tongue 119 cut in the stud shaft 110. A clutch pawl 120 is pivoted at 121 on the plate 116. The pawl is spring-urged to bring the clutch extension 122 thereof into cooperation with the clutch notch of the clutch disk 115. An extending arm 123 on the pawl 120 cooperates with a roller 124 on the end of a lever 125 pivoted on a stud 126. The horizontal portion of lever 125 carries a pair of rollers 127 which cooperate with the complementary cams 79 and 80 attached to the drive shaft 31. The cams are so designed that when the P clutch control magnet is energized and shaft 31 is driven, the cams 79 and 80 will rock the lever 125, permitting clutch pawl 120 to make a clutch connection with the disk 115, thereby establishing a driving connection between the Geneva gear wheel 109 and a gear 128 attached to disk 115. The gear 128 (Figs. 1a and 4) meshes with gears 129 and 130 on feeding rollers 103 and 101, respectively (see Fig. 2b). An idler gear 134 between the gear 130 and another gear 133 forms the driving connection to the feed roller 105. Another idler gear 234 between the gear 133 and gear 235 forms a driving connection for the feed roller 131. A small gear 135 on roller 103 cooperates with a similar gear 136 on roller 104. A similar gear connection is made between gears 130, 133, and 235 of rollers 101, 105, and 131, respectively and between gears 139, 140, and 240 of rollers 102, 106, and 132.

An idler gear 141 connects gear 136 to gear 142 on the contact roller 1021. Another idler gear 143, meshes with the gear of the feed roller 105 and drives a gear 144 on the contact roller 227 associated with the detail card analyzing brushes 19.

Summarizing the above construction, a driving connection is effected when the P clutch control magnet (Fig. 1a) is energized between the drive gear 26 and the pairs of feeding rollers shown in Fig. 2b associated with the punching mechanism. The first cycle of operation effects the feeding of a master card from hopper M, and a detail card from the D hopper to be analyzed by the analyzing brushes 17, and as a result of such analysis and comparison with the master card which is concurrently analyzed by brushes 16, the detail card will be fed step by step beneath the punches 18 and certain data on the master card will be reproduced on the detail card.

*Separate drive for feed rollers 65—66, 88, 197, for analyzing master card when R2 clutch is engaged*

Whenever the detail card corresponds to the master card, feeding rollers 65, 66 are driven to feed the master card past brushes 16 and the data analyzed thereby controls the punching mechanism to transpose this data to the detail card. This operation is controlled by the R2 clutch magnet.

To this end gear 33 drives a gear 92 (Fig. 1b) continuously. Gear 92 is loose on the feed roll shaft 88 and meshes with a gear 93 loose on shaft 94.

In the present machine and differing from the patented machine, attached to gear 93 is a notched clutch disk 95 engaged by a clutch pawl 96 when armature latch 97 of the clutch control magnet R2 is attracted. This is a well known form of one-revolution clutch mechanism and when engaged drives shaft 94. Shaft 94 also carries a gear 98 (Fig. 3a) which meshes with a gear 99 attached to feed roller 65 and which also carries a smaller gear 100 in mesh with a similar gear 204 on the associated roller 66 (see Fig. 2a). An idler gear 202 (Fig. 1b) meshes with gear 100 and drives the contact roller 281 through a gear 203 mounted thereon.

Gear 98 drives a gear 204 attached to feed roller shaft 88 and the gear 204 has secured to it a gear 205 meshing with a gear 206 secured to the lower feed roller shaft 197.

*Punching mechanism*

The construction of the punching mechanism shown in the mid-center of Fig. 2b is precisely the same as that shown and described in the patent to C. D. Lake, No. 2,032,805, dated March 3, 1936, to which reference may be had for details of construction and operation. A general description of the operation of this punching mechanism will be given and in sufficient detail so that the present improvements will be better understood.

After leaving the detail card sensing station, which comprises brushes 17, the detail card is fed between a stripper plate 166 and a die plate 167. Then the card enters between feed rollers 105 and 106 which feed it between the sensing brushes 19 and the contact roller 227. When the card leaves the brushes 19, it is engaged by rollers 131—132 which eject it into the detail card hopper 13.

The selective operation of the punches 18 will be explained with reference to Fig. 2b. In the present machine a constantly rotating shaft 153 is provided with an eccentric which is encircled by an arm 173, the latter having a pivotal connection to the punch operating bail 177. In the present machine, due to the interposition of the sensing station which includes the brushes 17 and the pairs of feed rollers 103—104 and 101—102, the shaft 153 carries the aforementioned cam disk 172. To effect the rotation of the shaft 153 the gear connections shown in Fig. 1a are provided, wherein it will be seen that the gear 134 has rotatable therewith a pinion 148 meshing with an idler gear 149 which meshes with a gear 150 which, through the idler gear 151, drives a gear 152 secured to the shaft 153, which shaft is shown in Fig. 2b as carrying the eccentric cam disk 172. Hence, when the P clutch control magnet (Fig. 1a) is energized, the shaft 153 will be given successive rotations during the punching cycle, there being one revolution of the shaft 153 for each index point position analyzed.

It will also be understood that in the patented machine as in the present machine the cards are fed in a direction parallel to the card columns so that the cards are presented beneath the punches 18 (Fig. 2b) as the index points 9, 8, 7—1 are analyzed in this named order. When a perforation is encountered on the master card by brushes 16 which is to be duplicated on the detail card, the punch magnet PM (Fig. 2b) is energized and this will draw a call wire 187, thereby moving the punch interposer 186 over the punch bail operating plate 177. Interposer 186 is pivoted on the related punch 18 and when the bail 177 is depressed it will, through the interposer 186, depress the punch 18 and perforate the card in the desired index point position in the column associated with the punch 18. There is, of course, a punch control magnet PM for each card column which is to be punched and during the punching cycle the magnets PM are energized at differential times and therefore effect the depression of the punches 18 at the corresponding differential times to perforate a plurality of card columns to represent the desired data.

It is thought that the above general description of the operation of the punching machine will suffice to give an understanding of the operation of the punching mechanism. For further details of construction and operation, reference may be had to the Lake Patent No. 2,032,805.

*General operations of machine*

Before the detailed operation of the machine will be given in connection with the wiring diagram, an understanding of the general operation of the machine will be found to be helpful. This general operation will now be given, particularly in connection with the diagrammatic view of Fig. 5.

The various feeding devices encompassed by the three different clutches are diagrammatically shown, wherein it will be seen that the engagement of the R1 clutch causes the operation of the picker knife 58, the feeding rollers 59 and 60 and contact roller 262. The R2 clutch when engaged causes operation of the feeding rollers 65—66 and 88—197 and contact roller 281. The P clutch on the other hand, when engaged, causes the operation of the picker knife 85 and the concomitant rotation of the four sets of feeding rollers 103—104, 101—102, 105—106 and 131—132 and contact rollers 227.

Before starting the operation of the machine, the master and detail cards are placed in the M and D hoppers, respectively and the cards are inserted with the printed face down and with the leading edge of the card adjacent to the nine index point positions. The start key is then depressed and at the beginning of the operation of the machine the R1, R2 and P clutches will be concurrently engaged and by two feeding cycles the bottom master and detail cards will be fed from each of the hoppers M and D and the fields to be analyzed will be analyzed by the respective analyzing brushes 15 and 17. During this second cycle of card feed these analyzing brushes will search the perforations in related fields of the master and detail cards and relays will be set up, and by the particular contacts closed by such relays, a comparison of the data can be made by an electrical circuit to determine whether the data is equal or if they disagree by the numerical data on one card being lower than the other. From the result of the first comparison, feeding of either the master or detail cards will be under control of the electrical comparing circuits and the R1 and the P clutches will no longer be engaged concurrently.

Thus, if at the end of the second cycle the comparing unit determines that the numerical data of the master card was lower than the numerical data of the first detail card, both clutches R1 and R2 will be concurrently engaged so that during the third cycle of operation the second master card is analyzed by the brushes 15, its data set up on the relays and compared with the retained setting of the relays from the first detail card. If, in the third cycle, the comparing unit determines that the first detail card is lower in numerical value than the second master card, the P clutch is energized in the fourth cycle to feed the second detail card from the related hopper which is analyzed and its numerical data set up on the respective relays. If, at the end of the third cycle, it is found that the second detail and second master card agree in numerical value, both the P clutch and the R2 clutches will be engaged on the next or fourth cycle. During this fourth cycle, the analyzing brushes 16 analyze other data on the master card and by controlling the PM punch magnets (Fig. 2b) the punches 18 are operated to reproduce the data on a field of the detail card. Summarizing, upon an agreement in numerical value the data from the master card is transferred to the detail card. A detail card is fed from the detail hopper D during this punching cycle because the P clutch operates the picker 85. The numerical value of the newly fed detail card is set up on the relays and compared with the numerical value of the second master card which has been retained on the respective relays. If this numerical value agrees, the P clutch is engaged and the sixth cycle ensues during which time the numerical data from the master card transferred to or is reproduced on the detail card. Of course, during this cycle, the fourth detail card is analyzed by the brushes 17 and its numerical value is compared with the numerical value of the master card which is still set up in the relays. A punch cycle then ensues which effects the transference of numerical data from the master card to the detail card and the above operation is repeated as long as detail cards agree in numerical value with the master card.

Whenever a master card is analyzed by the brushes 17 which is no longer equal but is lower in numerical value than the detail card, the R1 and R2 clutches are engaged and successive feeding of master cards will ensue until a master card arrives which is equal or greater in numerical value than the last detail card that has been analyzed by the brushes 17.

*Operation of machine in connection with wiring diagram*

Prior to the operation of the machine the operator inserts detail cards in the magazine D (Fig. 2b) and master cards in the M magazine (Fig. 2a), whereupon the cards in each stock operate the respective customary card levers MHL and DHL to close the related contacts MHC and DHC. From Fig. 6a it will be seen that a circuit will be closed from the line 200 through the related card lever contacts MHC and DHC to energize the R6 and R3 relays. R6 relay transfers its R6—1 contacts and the R3 relay transfers the R3—1 contacts, such being the position of the contacts prior to the depression of the start key ST.

The operator then depresses the start key and the circuit is closed from the line 200 through the stop key contacts 205, through R4—1 and R7—1 contacts now in the position shown, thence through R6—1 and R3—1 contacts both transferred, thence through the start key contacts 206, through the R1 relay to the line 201. With the start key maintained depressed by the operator the R1 relay will be retained energized through the circuit just described and when R1 relay is energized the R1—1 contacts are closed so as to close a circuit from the line 200, through R1—1 contacts, through the motor relay MR to line 201. The MR relay closes the MR1 motor relay contacts to start the motor M in operation. By initiating the operation of the motor M the constantly rotating cams designated CR now rotate from their position of rest. It is pointed out that in the previous stoppage of the machine the motor M coasts to a mid-cycle position and in its position of rest the CR15 contacts (Fig. 7) are now closed. Hence, when the R1 relay is energized the circuit is continued from the R1—1 contacts through the CR15 contacts to the R2 relay to line 201. The R2 relay closes its *h* holding contacts and the hold circuit is maintained through the CR5 contacts, back to line 200. Hereafter such relays which are provided with holding contacts will have the designation *h* designating holding contacts thereof. The CR5 contacts open at the end of the cycle to deenergize the R2 relay but in starting up the machine the start key is usually maintained depressed, so that even though the CR5 contacts open at the end of the cycle the R1 relay will be maintained energized to cause the next cycle of operation. The succeeding cycle of operation is a card feeding cycle in which cards are fed both from the M and D magazines. At the end of the cycle initiated by depression of the start key, cam contacts CR6 close, closing a circuit from line 200, through CR6 contacts, thence through R7—3 contacts now in the position shown, through R9 relay to line 201 and also from the CR6 contacts, through R4—3 contacts now in the position shown, through the R8 relay to line 201. R9 relay closes the R9—1 contacts (Fig. 6c) and R8 relay closes R8—1 contacts and with R2 relay maintained energized to hold the R2—2 contacts closed, a circuit is closed from line 200 when cam contacts CR14 close at the end of the cycle. This circuit is from the line 209 through CR14 contacts, R2—2 contacts, R8—1 contacts to the R1 clutch magnet to line 201 and also from the R2—2 contacts through R9—1 contacts to the P clutch control magnet to the line 201. Also a circuit is closed from the R8—1 contacts, through R10—3 contacts to the R2 clutch control magnet to line 201. With the R1, R2 and P clutch control magnets energized the card feeding mechanisms will be operative and the picker 55 will feed the lowermost detail card from the detail magazine D and the picker 58 will feed the lowermost master card from the magazine M. Of course, the related feeding rollers will also rotate and during the first card feed cycle the detail card will be fed out of the magazine D sufficiently so that its leading edge is close to the analyzing brushes 17 and the master card will be fed so that its leading edge will be adjacent the analyzing brushes 15, both cards then being in a position for analysis during the second card feed cycle. The second card feed cycle is effected by a second depression of the start key or by maintaining it depressed.

During the first card feed cycle certain card levers are actuated and consist of the RCL1 card lever actuated by the master card to close the RCC1 contacts and the PCL1 card lever actuated by the detail card to close the PCC1 contacts. The RCS1 card lever corresponds to the RCL2 card lever of Patent No. 2,032,805 and the PCL1 card lever herein corresponds to the DCL card lever of this patent. When the R5 contacts close, a circuit will be closed from line 200 through R5 contacts, RCC1 card lever contacts through R7 relay to line 201 and such relay will be held energized through the h or holding contacts and cam contacts R4 back to line 200. With the PCL1 card lever contacts closed when cam contacts P7 close a circuit will be closed from line 200, through P7 contacts, through PCC1 card lever contacts, through R4 relay to line 201. The latter closes the h or holding contacts and the hold circuit is maintained through such contacts and the P6 contacts back to line 200. During the second card feed cycle the contacts shown in Fig. 2b and Fig. 6a and designated "DCL" are actuated by the card fed from the detail card magazine and the stick circuit for the R1 relay is now maintained through the h contacts and the DCC contacts, thence through R3—1 and R6—1 now transferred, thence through R7—1 and R4—1 now transferred, stop key contacts 205, back to line 200.

The R4 relay transfers the R4—3 contacts, the R4—2 contacts, and the R7 relay transfers the R7—3 contacts. The impulse created by cam contacts CR6 will be directed at the end of the cycle to a test circuit line 207. The test circuit 207 is now associated with the comparing circuits for determining whether the compared data on the detail and master cards are equal or differ in numerical value.

During the second card feed cycle pressure on the start key can be relieved since the machine will continue by automatic cycles of operation as long as cards are fed, due to the maintained energization of the R1 relay by the circuit just described.

During the second card feed cycle the analyzing brushes 17 analyze the data on the first detail card fed and the analyzing brushes 15 analyze the data on the field of the master card which is to be compared. Contrasting with the machine shown in Patent No. 2,032,805, the detail and master cards are placed in the respective hoppers with the printed faces downward but like the patented machine in such position in the hoppers that the 9 index points of the card are adjacent the leading edges. Hence, the index points are analyzed in the sequence 9, 8, 7—0, as indicated in Fig. 7. During the second card feeding cycle the electrical comparing mechanism comes into operation to compare the numerical values of the first master and first detail cards and such comparing circuits will now be described.

Electrical comparing mechanism

The comparing mechanism herein shown for the purpose of determining whether the numerical value of the master and detail cards is equal or different is shown for three card columns and it will be assumed that card columns 1, 2 and 3 of the master card are compared with the correspondingly numbered card columns of the detail cards. Of course, the number of card columns that are compared may be increased or decreased, depending upon the situation but the three columns herein shown will explain the principles of operation.

In order to reduce the number of relays of the electrical comparing mechanism the numerical values of both the master and detail cards are set up in relays in combination according to the code shown in Fig. 6c.

For each card column, four relays are utilized to represent the digit and consist of relays R1, R2, R4 and R6 for each card column, for both the master and detail cards. The relays associated with the detail card are designated by the letter D whereas the relays associated with the master card are designated by M.

The analyzing brushes 15 analyze the numerical data of the master card and plug connections 213, 214, 215 are made between the plug sockets of such card columns to master relays M1, M2 and M3 (Fig. 6d) and such relays are energized at differential times in accordance with the perforations analyzed. The analyzing circuit extends from the line 200 through the cam contacts CR3, CR1, R1 which are closed during the time that the card holes are analyzed, and thence through the R7—2 contacts which are also closed during the analysis of the card perforations, thence through the contact roll 262, analyzing brushes 15, the related plug connections 213, 214 and 215 to the associated master relays M1, M2, and M3 to line 201. Each master relay will close the related 1, 2, 3 and 4 contacts, thereby connecting the related digit setup magnets R6M, R4M, R2M and R1M to the impulse transmitting lines 216. The function of the master relay M1 is to enable impulses singly or in combination transmitted by the lines 216 to be directed to the digit setup magnets R1 to R6 to thereby energize them in combination according to the code. To this end, constantly running cam contacts CR10, CR11, CR12 and CR13 will direct impulses to the lines 216. For example, if the 9 index point is analyzed it will be seen from the timing shown in Fig. 7 that at this time the CR10, CR11 and CR13 cam contacts close to thereby energize the R1, R2 and R6 relays. If the 6 index point position was perforated the CR13 cam contacts will direct an impulse at this time only to the R6 digit setup magnet. In the same manner, according to the code shown in Fig. 6c, the R1, R2, R4 and R6 relays are set up in combination and this occurs for the three card columns of the master card. Each digit setup magnet R1, R2, R4 and R6 when energized closes its holding contact h and the hold circuit for all of the master card digit setup relays of the three columns extends back by a line 217 through the R3 cam contacts back to line 200. Hence, the digit setup relays which are energized under control of the master card by the brushes 15 are held energized through cam contact R3 driven by shaft 52 (Fig. 1b) controlled by the R1 clutch. Thus, at the end of any cycle, all of the digit setup relays for the master card will be held energized and will not be deenergized until the beginning of the cycle when R1 clutch is again engaged and a new master card fed to the analyzing brushes 15.

Figure 6B:
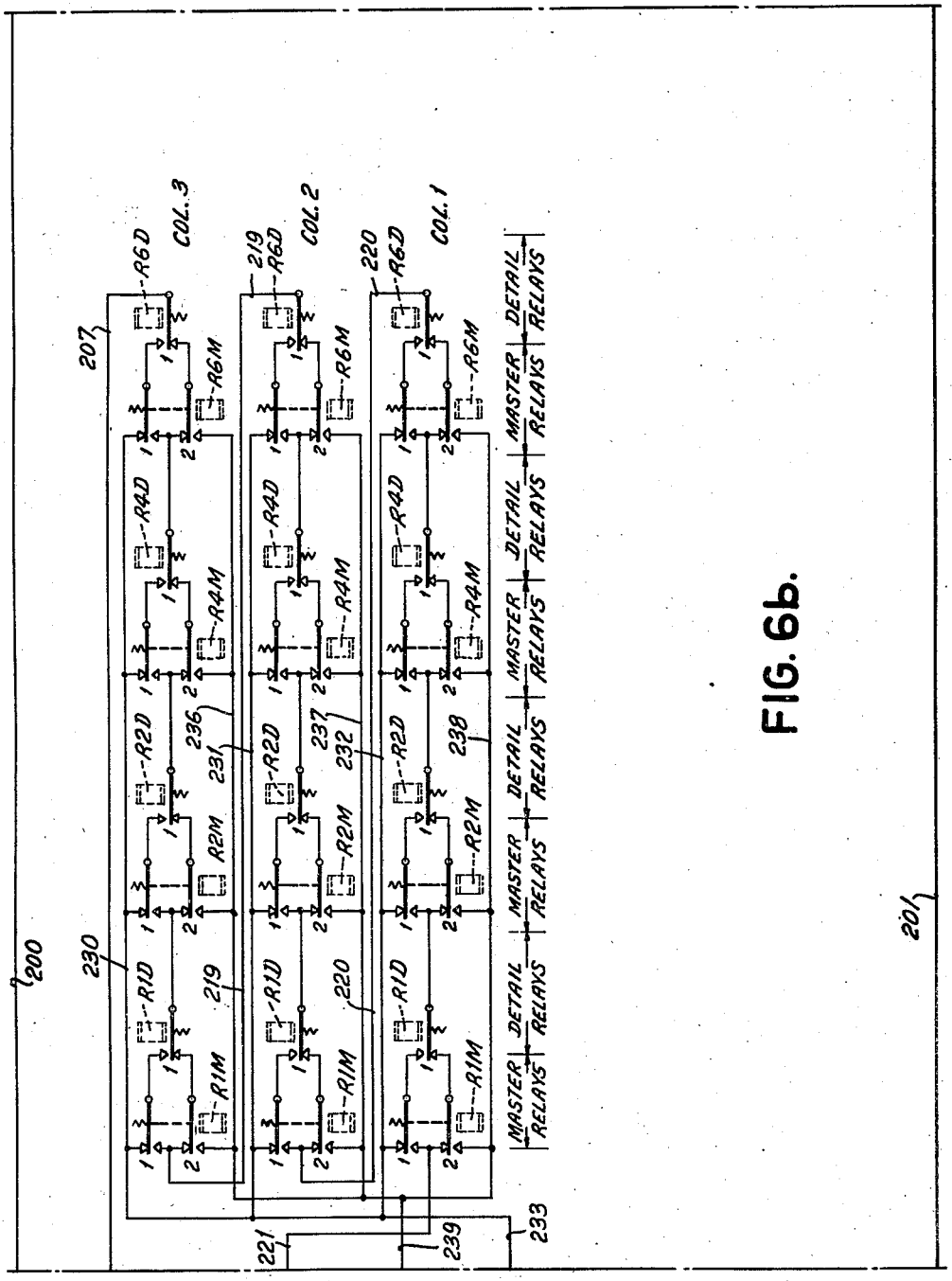

From Fig. 6c it will be seen that a similar relay digit setup unit is provided for the detail cards which are analyzed by the brushes 17. Plug connections 210, 211 and 212 are made between the plug sockets associated with card columns 1, 2 and 3 of the detail card to the master relays D1, D2 and D3. These are energized at differential times according to the digits of the numerical data. The analyzing circuit extends from the line 200 through the P1 cam contacts closed during the analysis of the index point positions, thence through the R4—4 relay contacts also closed during this time, to the contact roll 102f, the brushes 17, and thence through the respective plug connections 210, 211 and 212, to the master pickup relays D1, D2 and D3, to line 201. The master relay D1, for example, closes its 1, 2, 3 and 4 relay contacts, thereby connecting the impulse lines 216 to the digit setup relays R1D, R2D, R4D and R6D for the related card column. Hence, these relays will be set up in combination according to the code shown in Fig. 6c and in the manner previously explained. It should be noted, however, that when such digit setup relays R1D, R2D, R4D and R6D are energized they will close their respective holding contacts h and the hold circuit will be extended back by a line 218 through a cam contact P3 back to line 218. The P3 cam contact is driven by shaft 91 when the P clutch is engaged and therefore the detail comparing relays R1, R2, R4 and R6 which are energized will be held energized until the P clutch is again engaged whereupon cam contact P3 will open at the beginning of the next cycle when a detail card is fed to deenergize the relays preparatory for another digit setup for the next detail card. In the preceding description it was assumed that a master card was analyzed by the brushes 15 concurrently with the analysis of a detail card by the analyzing brushes 17, this being effected during the second card feed cycle During this second card feed cycle the comparing fields on the master and detail cards will be set up on the detail comparing relays R1D, R2D, R4D and R6D and also on the master comparing relays R1M, R2M, R4M and R6M and at the end of the cycle test circuits will be effective to test the circuit network made by the associated contacts shown in Fig. 6b to determine whether the numerical values are equal or are different. In subsequent operations of the machine the feeding of the detail and master cards will now be entirely under control of the comparing circuits and the P and R1 clutches will no longer be engaged concurrently.

In the following description it will be assumed that the numerical values of both the detail and the master cards agree and as a result of the electrical comparing network the R10 or equal relay (Fig. 6a) will be energized to cause the energization of both the P and the R2 clutch control magnets (Fig. 6c), whereupon by the R2 clutch the master card will be fed past the analyzing brushes 16 and numerical data preferably on another card field of the master card will be analyzed to control the operation of the punches 18 (Fig. 2b). The engagement of the P clutch will cause the detail card to be fed past such punches and thereby punch the card according to the numerical data of the master card. This will effect the transference of numerical data on the master card to the detail card.

*Operation of punching mechanism when numerical value of master and detail cards is alike*

To understand the operation of the machine upon sensing equality in numerical values of the analyzed master card and detail cards, it will be assumed that the card columns thereof are both perforated to represent 183. Referring to the code shown in Fig. 6c, upon sensing the 1 perforation, the R1D and R1M relays are concurrently energized and held energized. For the 8 digit, relays R6M and R6D are concurrently energized as well as R2D and R2M relays. For column 1 the digit 3 is represented by the energized condition of the R2D and R2M relays and the R1D and R1M relays. Each of the aforesaid relays is held energized during the card feed cycle, in which they are analyzed and at the end of this cycle upon the closure of the CR6 cam contacts a test impulse is directed by the wire 207 to the circuit network. Each of the aforesaid relays in the example assumed will transfer their respective 1 or 2 contacts in Fig. 6b and they will be held in such transferred position when cam contacts CR5 close. For the assumed example the test circuit is from the line 200 through cam contacts CR6 (Fig. 6a), wire 207, through R6D1 contacts now in the position shown, through R6M2 contacts now in the position shown, through R4D1 contacts now in the position shown, through R4M2 contacts now in the position shown, thence through R2D1 contacts now in the position shown, through R2M1 contacts now in the position shown, thence through R1D1 contacts now transferred and R1M1 now transferred, thence by a wire 219 to the network of column 2. The circuit then extends by the wire 219 through R6D1 contacts now transferred, R6M1 contacts now transferred, through R4D1, R4M1, both now in the position shown, thence through R2D1 and R2M1, both now transferred, thence through R1D1 and R1M2, both now in the position shown to wire 220 which extends the test impulse to column 1. The circuit then extends through R6D1, R6M2, R4D2, R4M2, all of which are now in the position shown, thence through R2D1, R2M1, R1D1 and R1M1 contacts, all of which are now transferred to wire 221 which extends as shown in Fig. 6a to the R4—2 contacts, and through such closed contacts to the pickup winding of the R10 relay to line 201. When the R10 or "Equal" relay is energized it will close the h contacts and the stick circuit for the H or hold winding extends through such contacts and the P2 cam contacts.

Referring now to Fig. 6c the closure of the R10—4 contacts causes the energization of the P clutch control magnet and the closure of the R10—3 contacts causes the energization of the R2 clutch control magnet. Therefore, both the P and R2 clutches will be engaged at the end of the cycle in which the detail and master cards will be found equal and the detail card will be fed during the next cycle past the punches 18 and the master card will be fed past the analyzing brushes 16 to energize the punch selecting magnets PM by circuit connections now to be described.

Assuming that the data to be transferred from the master card to the detail card consists of card columns other than those which are compared with the detail card, plug connections 222 (Fig. 6d) will be made from such card columns. Assuming that the data on card columns 4, 5 and 6 on the master card is to be transferred to similarly numbered card columns of the detail card, plug connections 222 will be made to the master card analyzing brushes 16 for such card columns. During the time that the master card passes the brushes 16 the impulse circuit will be transmitted from the line 200, through P1 contacts closed during the analyzing and punching cycle, thence through RCC2 card lever contacts closed by card lever RCL2 (which correspond respectively to CHCL and CHC of Patent No. 2,032,805), the contact roll 281, brushes 16, the plug connections 222, thence through the RS1, RS2 and RS3 contacts now in the position shown, through the plug connections 223 to the PM punch selecting magnets of the card columns which are to be punched on the detail card. If similarly numbered card columns are to be punched then plug connections 223 will be made to the PM punch selecting magnets for columns 4, 5 and 6. The common side of the punch selecting magnets PM extends through the R12—2 contacts to line 201. R12—2 contacts are closed to complete the impulse circuits to the punch selecting magnets PM by the circuit arrangement now to be described.

Referring to Fig. 6a, with R10—1 contacts now closed, cam contacts P12 close a circuit from the line 200 through cam contacts P12, relay contacts R10—1 to the pickup winding of the R12 relay to line 201. R12 closes the stick contacts R12h and a holding circuit is provided for the R12 relay through such holding contacts and cam contacts CR9, which latter retain the R12 relay energized during the punching operation. It is pointed out that the P12 cam contacts are closed at the early part of the cycle in which the punching operation is effected. Hence, with the R12—2 contacts (Fig. 6d) closed, the circuits to the PM punch selecting magnets can be closed to the line 201.

*Mode of operation for transferring data to detail cards following the first equal detail card when they all agree with the master card*

The above describes the operation of the machine for transferring the data from the master card to the first detail card found to be in agreement therewith. The mode of operation of the machine changes when following detail cards are found to agree with the master card. During the time that the first detail card is passing the punches 18 concurrently with the passage of the master card by the brushes 16, a following detail card is being fed past the analyzing brushes 17 and its numerical values in columns 1–3 are compared with the digit setup of the master comparing relays which are still retained energized.

It will be recalled that the holding circuit for the master comparing relays is back through wire 217 and cam contacts R3 and since cam contacts R3 are retained closed at the end of the cycle it will be seen that the setup on the master comparing relays is retained until the R1 clutch is again engaged. (See Fig. 5.) However, in the cycle in which punching is effected on the first detail card, cam contacts P3 (Fig. 6c) open at the beginning of the cycle so that as the following detail card passes the analyzing brushes 17 the detail comparing relays will again be set up to represent the numerical data of the following detail card. At the end of the analyzing cycle, the cam contacts CR6 again transmit an impulse to the test circuit 207 and if the numerical data represented by the detail comparing relays which were set up during this cycle agrees with the data represented by the master control setup on the relays for the first master card, the R10 relay will again be energized by the circuit previously described. This results in the concurrent engagement of the P clutch and the R2 clutch, the R2 clutch causing the feeding of the master card from brushes 16 by the feeding rollers 88 and 197 (Fig. 2a) to be deposited in the master card storage hopper 12. However, the engagement of the P clutch causes the first detail card to be fed past the analyzing brushes 19 concurrently with the passage of the following detail card by the punches 18, and by a circuit now to be described the punch selecting magnets PM are energized under control of the analyzing brushes 19 in accordance with the numerical data on the following detail card.

At the end of the cycle in which the electrical comparing mechanism determines that the numerical value of the following detail card agrees with the setup on the master comparing relays the R10 and the R12 relays are energized by the circuit previously described so that when cam contacts CR8 close (Fig. 6c), a circuit will be closed from the line 200, through cam contacts CR8, relay contacts R10—5, relay contacts R12—1, the RS relay to line 201. The latter closes its h contacts and the RS relay is held energized through such contacts and cam contacts P8, which latter retain the RS relay energized during the cycle of operation in which the following detail card is punched under control of the detail card passing the brushes 19.

The RS or selector relay coordinates the analyzing brushes 19 (Fig. 6d) with the punch selecting magnets PM and breaks the previous connection of the analyzing brushes 16 with the punch selecting magnets PM. When the RS relag is energized it will transfer its 1, 2 and 3 contacts so that the analyzing circuit will be closed from the line 200 through cam contacts P1, thence through card lever contacts PCC2 closed by the card lever PCL2 (corresponding to PCL and PC1, respectively, of Patent No. 2,032,805), thence to the contact roll 227, analyzing brushes 19, plug connections 228, thence through the now transferred contacts 1, 2 and 3 of the RS relay, thence by plug connections 223 to the punch selecting magnets PM, thence through relay contacts R12—2 to the line 201. Hence, the detail card which follows the first detail card and which is found to agree with the master card is punched under control of the first detail card as it is analyzed by brushes 19. Of course, during the cycle of operation in which such punching is effected the following detail card is being analyzed by the brushes 17 and its digit setup on the detail comparing relays is compared with the digit setup of the master comparing relays. Upon an agreement a repetition of the above described operation of the machine is effected and thus the punching unit shown in Fig. 2b will be repeatedly operated as long as the successively fed detail cards agree in numerical value with the setup on the master comparing relays. This repetition in operation continues until a detail card is analyzed by the analyzing brushes 17 found to differ from the numerical value setup on the master comparing relays. The mode of operation then changes dependent upon whether the detail card is found to be lower in numerical value than the digit setup on the master comparing relays, or if the detail card is found to be higher in numerical value than the digit setup on the master comparing relays. These two different possible operations of the machine will now be described.

*Feeding of master card alone when master card is lower in numerical value than detail card*

The electrical comparing mechanism is of such construction and arrangement that it is capable of determining when a master card is lower, or in other words, when a detail card is higher in numerical value than the master card and this determination is effected as a result of the analysis of a master card by the brushes 15 concurrently with the analysis of the detail card by the brushes 17 or, on the other hand, it may be the result of a comparison of a detail card as it is analyzed by the brushes 17 with the setting up of the master comparing relays, or the result of the comparison of a master card as it is analyzed by brushes 16 with the setup of the detail comparing relays. In any case, when the digital value of the detail card is greater than the digital value of the master card in the same card column, one of the relays R1D, R2D, R4D, or R6D is energized without an accompanying energization of a similarly numbered M relay. In other words, somewhere in the circuit network shown in Fig. 6b for a single card column, one of the R1D, R2D, R4D and R6D relays will be energized to transfer its related "1" contacts without the related R1M, R2M, R4M and R6M relay being energized to transfer the related "2" contacts. The transfer of the "1" contacts of a single "RD" relay will transfer the test impulse somewhere in the circuit contact network to either a line 230, 231 or 232 for columns 3, 2 and 1. Therefore, whenever the digital value in any column of the detail card exceeds the digital value of the master card in the same card column, the circuit network will indicate that a detail card has been analyzed or there is a representation on the detail comparing relays which is higher in numerical value and accordingly change the mode of operation of the machine carried out when there is an agreement.

It is explained that the code of relays and contact network is such that this difference can be detected. In the previous example, it was assumed that the master card represented the numerical value 183. If the detail card compared therewith represents the numerical value 283, the similarly numbered M and D relays will be energized in columns 2 and 3 but in column 1 the R1M relay will be energized but the R2D relay will also be energized, according to the code shown in Fig. 6c. Hence, the test impulse will be directed by the wire 201, through the contact network for column 3, thence through column 2, then by wire 220 through contacts R6D1, R6M2, R4D2, R4M2, all of which are in the normal position shown, thence through the R2D1 contacts now transferred, to the line 232, the R2M1 contacts now normal, the joining line 233, thence through the R4—3 contacts now closed to the "High detail card relay" R8, to line 201.

Other examples will now be described to indicate that other pairs of different digits will have a similar effect in the circuit arrangement. For example, if the digital value in the detail card was 9 in column 3, and 8 in column 3, of the master card the R2M and R6M relays will be energized to represent 8 whereas the R1D, R2D and R6D relays will be energized in the same column to represent 9. The transfer of the R6D1 contacts will attempt to pass the test impulse to the wire 230 but this is nullified by the energization of the R6M relay which transfers the R6M1 contacts so that the test impulse will then be directed to the R4D1 contacts, the R4M2 contacts now in the position shown, to the R2D1 contacts which are now transferred, but since the R2M relay is energized the test impulse will pass through R2D1 contacts now transferred, the R2M1 now transferred, to the R1D1 contacts now transferred. At this point in the circuit network a relay R1D is energized without an accompanying energization of the R1M relay and therefore the transfer of the contacts R1D1 directs the test impulse to the wire 230.

It will be assumed for another example that the digital value of the detail card is 7 and the master card is 6. Both the R6D and R6M relays will be energized according to the code, but the R1D relay will be energized alone. Hence, in the same manner, the test impulse will be directed serially through all of the contacts which are now normal and closed to the R1D1 contacts which are now transferred and the test impulse will be directed by one of the wires 230, 231, 232, wire 233 to the R4—3 contacts to the R8 relay. Other examples may be worked out and it will be observed that in each instance irrespective of the difference in digital value in a column of the master and detail cards, whenever the digital value of the detail card is greater than the master card the R8 relay will be energized. The energization of the R8 relay takes place at the end of the cycle in which the detail card is analyzed and when the R8 relay is energized it will close its stick or *h* contacts and the stick circuit extends through such contacts and cam contacts R2. Cam contacts R2 hold the R8 relay energized during the next cycle of operation. Therefore, with the R8—1 contacts (Fig. 6c) now closed, a circuit will be closed at the end of the cycle when CR14 cam contacts close, and through such contacts, the R2—2 contacts, the R8—1 contacts to the R1 clutch control magnet and the impulse is also directed from the R8—1 contacts through the R10—3 contacts now in the position shown, to the R2 clutch control magnet.

The engagement of the R1 and R2 clutches will, as indicated in Fig. 5, cause the feeding of a master card past the analyzing brushes 15 and a preceding master card to the storage hopper 12. It should be noted that since the P clutch is not engaged, the P3 cam contacts (Fig. 6c) will still be closed so as to hold the digit setup on the detail comparing relays and during this cycle the digital value of the master card now analyzed will be compared with the numerical value of the detail card and the machine will operate in accordance with the result of the comparison.

Sometimes the numerical value of the detail card is lower than the numerical value of the compared card columns of the master card and when this is determined, a different mode of operation of the machine ensues as will now be described.

*Feeding of detail cards alone when detail card is lower in numerical value than master card*

The electrical comparing mechanism is of such construction and arrangement that it is capable of determining when a detail card is lower in numerical value than the master card, or in other words, when a master card is higher. This determination may be effected upon the concurrent analysis of a master card by the brushes 15 and the detail card by the brushes 17. On the other hand, a master card may be fed and analyzed by the brushes 15 and compared with the digit value setup retained on the detail comparing relays. In another mode of operation it may happen that a detail card is fed to be analyzed by the brushes 17 and compared with the digit setup retained on the master comparing relays.

In any event this will result in the energization of a master comparing relay without the energization of an accompanying similarly numbered detail comparing relay. This situation may arise in any card column by virtue of the fact that the numerical value of the digit on the detail card in one card column is lower than the digital value of the master card in the same card column. Whenever this is determined, the test impulse will be directed by the wire 207 to the circuit contact network for each card column until in some particular series of contacts a point is reached where a master comparing relay is energized to transfer its "2" contacts without the similarly numbered detail comparing relay being energized to transfer its "1" contacts. As previously described the test impulse is directed through all normally closed contacts, the transferred contacts where there is a concurrent energization of similarly numbered master and detail comparing relays, until a point is reached where the "2" contacts of one of the master relays are transferred. The test impulse is then directed through such transferred "2" contacts, to one of the lines 236, 237 or 238 for card columns 1, 2 and 3, respectively. Each of such wires is joined to a wire 239 (Fig. 6a) which directs the impulse through the R7—3 contacts now closed, to the R9 relay. The R9 relay closes the h contacts and the stick circuit for the holding coil extends back to line 200 through such contacts and the cam contacts P2.

From Fig. 6c it will be observed that the relay R9 closes the R9—1 contacts and causes the energization of the P clutch control magnet which sets into operation all of the card feeding mechanism shown in Fig. 2b and diagrammatically shown at the right of Fig. 5. This results in the feeding of a following detail card past the analyzing brushes 17 and the numerical value of the detail card is then compared with the numerical value of the master card which is still set up on the master card comparing the relays. In the event that there is no concurrent feeding of the master card past the brushes 15 as a result of the analysis of the detail card, there is a new setup of the detail comparing relays and the contacts of the comparing network circuit of Fig. 6b, and in accordance with the condition of the electrical comparing network the ensuing mode of operation of the machine will be determined.

Hence, it is obvious that after the machine has been initiated in operation and until cards run out of the machine, card feeding operations from either the detail or master card magazines will be entirely under control of the electrical comparing network, resulting in the feeding of detail cards when the latter is found to be lower in numerical value than the master card and feeding of a master card whenever it is determined that a detail card is higher in numerical value than the master card. Whenever the electrical comparing mechanism determines that there is equality in the numerical values of the master and detail cards there will be a transference of data from the master card to the first detail card and thereafter from each detail card which has received the transferred data to the following detail card, provided that equivalency in numerical value continues for detail cards successively following the master card of the same classification group.

As previously intimated, initiation of the operation of the machine cannot be effected unless there are cards in the master and detail magazines and accordingly when the last card in either magazine is run through the machine, the machine will stop by virtue of the transfer of only one of the contacts R4—1 or R7—1 in the motor operating circuit of the machine. When such a stop occurs the machine cannot be started by depressing the start key without placing additional cards in the empty magazine. If, however, cards in one magazine run out at the end of a run and there are no additional cards to be placed therein the runout key RO (Fig. 6a) is depressed to close its contacts 241. These contacts shunt R3—1 and R6—1 contacts to close the circuit to the R1 relay in the vent that only one of the contacts R6—1 and R3—1 in the initiating circuit should be transferred. When this key is depressed the machine will continue its operation until there is the last possible match or comparison between the detail and master cards. If there are still cards then remaining in one magazine the operator must remove them from the magazine and the continued depression of the start key will continue the operations of the machine until all remaining cards are fed out.

In the preceding description and following claims the terms "master" and "detail" are used to describe the classification of cards preferably used in the present machine and since it is quite clear that the cards may have other designations or classifications, the terms adopted are not to be considered as restrictive, and are merely used in the claims to illustrate and to point out the different classification of the cards employed.

Furthermore, selective feeding of master and detail cards when they are found to be lower in numerical value is the preferred mode of operation since previous sorting will place them in ascending digital order. Likewise, the mode of operation may be the reverse when the detail and master cards are sorted to a descending numerical or digital order. Either mode of operation is within the principles of the invention.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a recording machine, the combination of punching means of the column by column punching type, means for sensing master cards and detail cards including supplemental sensing means for said master cards, means for feeding differently classified master cards past both of said master card sensing means, means for feeding detail cards past said sensing means and said punching means, means controlled by said master and detail card sensing means for comparing the classification data of said master and detail cards, and means controlled by said comparing means for causing upon the determination of a particular relationship in the classification data of the master and detail cards the feeding of a master card past said supplemental master card sensing means column by column synchronously with the column by column feeding of a detail card past said punching means, and for effecting the column by column punching operation of the punching means under control of said supplemental master card sensing means as the corresponding columns of the master card are sensed, whereby data on the master card is transferred column by column to a detail card.

2. In a recording machine, the combination of punching means of the column by column punching type, means for sensing master cards and detail cards, supplemental sensing means for said master cards, separate means for feeding differently classified master cards past the related sensing means and past the supplemental sensing means, means for feeding detail cards past said sensing means and said punching means, means controlled by the first named sensing means for comparing the classification data of said master and detail cards, and means controlled by said comparing means for causing upon the determination of a particular relationship in the classification data of sensed master and detail cards the operation of the feeding means to feed the master card past said supplemental master card sensing means column by column and a detail card concurrently column by column past said punching means, and for effecting the column by column punching operation of the punching means under control of said supplemental master card sensing means, whereby data on the master card is transferred column by column to a detail card.

3. In a card punching machine, the combination of a master card analyzing means, a detail card analyzing means, a supplemental master card analyzing means for analyzing data to be transferred, comparing means controlled by the master and detail card analyzing means for comparing the classification data of a pair of master and detail cards for determining their agreement or disagreement, punching means of the column by column punching type, means controlled by said comparing means when agreement is determined to effect the column by column punching operation of the punching means under control of the supplemental master card analyzing means to effect the transference of data from the master card to the detail card, and means controlled by said comparing means upon determining that compared master and detail cards disagree in classification for causing the feeding of a following detail or master card, whichever is lower in classification data to the related analyzing means for comparison with the master or detail card of higher classification data.

4. In a card punching machine, the combination of a master card analyzing means, a detail card analyzing means, a supplemental master card analyzing means for analyzing data to be transferred, comparing means controlled by the master and detail card analyzing means for comparing the classification data of a pair of master and detail cards for determining their agreement or whether a detail card is lower in classification data or whether a master card is lower in classification data, punching means of the column by column punching type, means controlled by said comparing means when agreement is determined to effect the column by column punching operation of the punching means under control of the supplemental master card analyzing means to effect the transference of data from the master card to the detail card, and means controlled by said comparing means upon determining that a following detail card is lower in classification data for causing the feeding of one or more detail cards to the detail card analyzing means for comparison purposes until equality with the master card is reached, or upon determining that the master card is lower in classification data for causing the feeding of one or more master cards to the master card analyzing means for comparison purposes until a master card is analyzed which agrees in classification data with the following detail card.

5. In a machine of the class described, the combination of a punching means, a detail card analyzing means, a supplemental detail card analyzing means, a master card analyzing means, a supplemental master card analyzing means, comparing means controlled by the aforesaid detail card and master card analyzing means for effecting upon agreement in classification data of master and detail cards the operation of said punching means under control of said supplemental master card analyzing means to transfer data from the master card to the detail card, and to cause the feeding of the next detail card to the detail card analyzing means, and means responsive to the agreement of the next detail card with the master card determined by the comparing means for then causing the operation of said punching means under control of the supplemental detail card analyzing means to cause the latter to analyze the transferred data on the preceding detail card to transfer said transferred data to the next detail card.

6. In a card punching machine in which master and detail cards are arranged, for example, in ascending numerical sequence, the combination of a master card analyzing means, a detail card analyzing means, a supplemental master card analyzing means for analyzing data to be transferred, comparing means controlled by the master and detail card analyzing means for comparing the classification data of a pair of master and detail cards for determining their agreement or disagreement, punching means of the successively column by column operated type, means controlled by said comparing means when agreement in classification data is determined to effect the feeding of the next detail card to said detail card analyzing means and the coordination of the punching means and the supplemental master card analyzing means to effect the column by column punching operation of the punching means under control of the supplemental master card analyzing means as the corresponding columns of the master card are being analyzed to effect the transference of data from the master card to the detail card, means controlled by said comparing means upon determining that a detail card disagrees in classification data represented by a master card or vice versa, for causing the selective feeding of the master or detail cards, whichever is lower in classification data, until equality is again determined by the comparing means.

7. In a card punching machine, the combination of a master card analyzing means, means for feeding master cards past said master card analyzing means, a detail card analyzing means, means for feeding detail cards past said detail card analyzing means, a supplemental master card analyzing means for analyzing data to be transferred, means for feeding master cards past said supplemental master card analyzing means, comparing means controlled by the master and detail card analyzing means for comparing the classification data of a pair of master and detail cards for determining their agreement or disagreement, punching means of the column by column punching type, means controlled by said comparing means when agreement is determined to effect the operation of the master card feeding means and the operation of the punching means under control of the supplemental master card analyzing means to effect the punching of data on the detail card column by column as the master card is analyzed column by column, and the operation of the detail card feeding means to feed the next detail card to be analyzed to said detail card analyzing means, and means under control of the comparing means to selectively cause the operation of the detail card feeding means or the master card feeding means when the detail card or the master card is found to be lower in classification data, respectively, until equality in classification data of master and detail cards is determined by the comparing means.

8. In a machine of the class described, the combination of a punching means of the column by column punching type, a detail card analyzing means, a supplemental detail card analyzing means, a detail card feeding means, a master card analyzing means, a master card feeding means, a supplemental master card analyzing means, comparing means controlled by the aforesaid detail card and master card analyzing means for effecting, upon agreement in classification data of master and detail cards, the operation of said punching means under control of said supplemental master card analyzing means, and the operation of the master and detail card feeding means to cause data to be punched column by column on the detail card under control of the master card as the master card is analyzed column by column by the supplemental master card analyzing means, and to cause the feeding of the next detail card to the detail card analyzing means, and means responsive to the agreement of the next detail card with the master card determined by the comparing means, for causing the operation of said punching means under control of the supplemental detail card analyzing means and the operation of the detail card feeding means to feed said next detail card column by column past said punching means as a preceding punched detail card is analyzed column by column by the supplemental detail card analyzing means, and to cause the feeding of still another following detail card to the detail card analyzing means.

9. In a card punching machine, the combination of a master card analyzing means, a detail card analyzing means, a supplemental master card analyzing means for analyzing data to be transferred, a supplemental detail card analyzing means for analyzing data on a detail card which has been transferred from a master card, comparing means controlled by the master and detail card analyzing means for comparing the classification data of a pair of master and detail cards for determining their agreement or disagreement, punching means, means controlled by said comparing means when agreement is determined to effect the operation of the punching means under control of the supplemental master card analyzing means to effect the transference of data from the master card to the first detail card, and means controlled by said comparing means upon determining that a following detail card also agrees in classification data with a master card of the same classification group for then causing the operation of the punching means under control of the supplemental detail card analyzing means to thereby transfer the transferred punched data from a preceding punched detail card to a following detail card.

10. In a card punching machine, the combination of a master card analyzing means, means for feeding master cards to be analyzed by said master card analyzing means, a detail card analyzing means, a supplemental master card analyzing means for analyzing data to be transferred, means for feeding master cards to be analyzed by said supplemental master card analyzing means, a supplemental detail card analyzing means for analyzing data on a detail card transferred from a master card, punching means, means for feeding a detail card to and past said detail card analyzing means, a detail card from said detail analyzing means to and past said punching means, and a punched detail card from said punching means to and past said supplemental detail card analyzing means, comparing means controlled by the master and detail card analyzing means for comparing the classification data of a pair of master and detail cards for determining their agreement or disagreement, means controlled by said comparing means when agreement is determined to effect the operation of the feeding means for feeding master cards past said supplemental master card analyzing means, the operation of the feeding means for feeding a detail card past said punching means, and the operation of the punching means under control of the supplemental master card analyzing means to effect the transference of data from the master card to the first detail card, and for causing the operation of the detail card feeding means to feed a following detail card preceding the punched detail card past the detail card analyzing means, and means controlled by said comparing means upon determining that a following detail card analyzed by the detail card analyzing means also agrees in classification with a master card from which data has been transferred for causing the operation of the detail card feeding means to feed a punched detail card past said supplemental detail card analyzing means and the following detail card past said punching means and the operation of the punching means under control of the supplemental detail card analyzing means to thereby transfer the transferred punched data from a preceding punched detail card to a following detail card.

11. In a card punching machine, the combination of a master card analyzing means, means for feeding master cards to be analyzed by said master card analyzing means, a detail card analyzing means, a supplemental master card analyzing means for analyzing data to be transferred, means for feeding master cards to be analyzed by said supplemental master card analyzing means, a supplemental detail card analyzing means for analyzing data on a detail card transferred from a master card, punching means, means for feeding a detail card past said detail card analyzing means, a detail card from said detail analyzing means past said punching means, and a punched detail card past said supplemental detail card analysing means, comparing means controlled by the master and detail card analyzing means for comparing the classification data of a pair of master and detail cards for determining their agreement or disagreement, means controlled by said comparing means when agreement is determined to effect the operation of the feeding means for feeding master cards past said supplemental master card analyzing means and the operation of the punching means under control of the supplemental master card analyzing means to effect the transference of data from the master card to the first detail card, and for causing the operation of the detail card feeding means to feed the punched detail card to said supplemental detail card analyzing means, means controlled by said comparing means upon determining that a following detail card also agrees in classification with a master card from which data has been transferred for causing the operation of the detail card feeding means to feed said punched detail card past said supplemental detail card analyzing means and the operation of the punching means under control of the supplemental detail card analyzing means to thereby transfer the transferred punched data from a preceding punched detail card to a following detail card, and means controlled by said comparing means upon determining that master and detail cards disagree for causing, when the master card is lower in classification data, the operation of the master card feeding means for comparison of the next master card with the detail card, and when the detail card is lower in classification data for causing the operation of the detail card analyzing means for comparison of the next detail card with the master card, both feeding means being selectively operated upon each determination of disagreement until equality in classification data is again reached.

12. In a card punching machine, the combination of a master card analyzing means, means for feeding master cards to be analyzed by said master card analyzing means, a detail card analyzing means, a supplemental master card analyzing means for analyzing data to be transferred, means for feeding master cards to be analyzed by said supplemental master card analyzing means, a supplemental detail card analyzing means for analyzing data on a detail card which has been transferred from a master card, punching means, means for feeding a detail card past said analyzing means, a detail card past said punching means, and a detail card past said supplemental detail card analyzing means in successive detail card feeding operations, comparing means controlled by the master and detail card analyzing means for comparing the classification data of a pair of master and detail cards for determining their agreement or disagreement, means controlled by said comparing means when agreement is determined to effect the operation of the feeding means for feeding master cards past said master card analyzing means, the operation of the detail card feeding means to feed a detail card past said punching means, and the operation of the punching means under control of the supplemental master card analyzing means to effect the transference of data from the master card to the first detail card, and for causing the operation of the detail card feeding means to feed a following detail card to said detail card analyzing means, means controlled by said comparing means upon determining that a following detail card also agrees in classification with a master card from which data has been transferred for causing the operation of the detail card feeding means to feed a punched detail card past said supplemental detail card analyzing means and the following detail card past said punching means, and the operation of the punching means under control of the supplemental detail card analyzing means to thereby transfer the transferred punched data from a preceding punched detail card to a following detail card, and means controlled by said comparing means upon indication of disagreement in master and detail cards to cause the selective operation of the master card feeding means and the detail card feeding means when it is determined, respectively, that master and detail cards are lower in classification data until a pair is compared that indicates equality.

13. In a card punching machine, the combination of a master card analyzing means, means for feeding master cards to be analyzed by said master card analyzing means, a detail card analyzing means, a supplemental master card analyzing means for analyzing data to be transferred, means for feeding master cards to be analyzed by said supplemental master card analyzing means, a supplemental detail card analyzing means for analyzing data on the detail card transferred from a master card, punching means, means for feeding a detail card past said detail card analyzing means, a detail card from said detail card analyzing means past said punching means, and from said punching means past said supplemental detail card analyzing means, comparing means controlled by the master and detail card analyzing means for comparing the classification data of a pair of master and detail cards for determining their agreement or disagreement, means controlled by said comparing means when agreement is determined to effect the operation of the feeding means for feeding master cards past said master card analyzing means the operation of the detail card feeding means to feed a detail card past said punching means, and the operation of the punching means under control of the supplemental master card analyzing means to effect the transference of data from the master card to the first detail card, and for causing the operation of the detail card feeding means for feeding a following detail card past the detail card analyzing means, means controlled by said comparing means upon again determining that a following detail card analyzed by the detail card analyzing means also agrees in classification with a master card from which data has been transferred for causing the operation of the detail card feeding means to feed a punched detail card past the supplemental detail card analyzing means and the following detail card past said punching means, and the operation of the punching means under control of the supplemental detail card analyzing means to thereby transfer the transferred punched data from a preceding punched detail card to a following detail card, and means controlled by the comparing means upon determining that master and detail cards disagree for causing the operation of the master card feeding means or the detail card feeding means depending upon whether the master or detail cards are lower in classification data respectively, for comparison with the master or detail card of higher classification until equality is again reached.

14. In a card punching machine, the combination of a master card analyzing means, a detail card analyzing means, a supplemental master card analyzing means for analyzing data to be transferred, a supplemental detail card analyzing means for analyzing data on a detail card transferred from a master card, comparing means controlled by the master and detail card analyzing means for comparing the classification data of a pair of master and detail cards for determining their agreement or disagreement, punching means, means controlled by said comparing means when agreement is determined to effect the operation of the punching means under control of the supplemental master card analyzing means to effect the transference of data from the master card to the detail card and for causing the feeding of a following detail card to the detail card analyzing means, means controlled by said comparing means upon again determining that a following detail card also agrees in classification with a master card from which data has been transferred for causing the operation of the punching means under control of the supplemental detail card analyzing means to thereby transfer the transferred punched data from a preceding punched detail card to a following detail card, and means controlled by said comparing means upon determining that a detail card disagrees with the master card for causing the feeding of detail cards or master cards, whichever is lower in classification data to the related analyzing means for comparison with the master or detail card of higher classification until equality is determined by the comparing means.

15. In a card punching machine, the combination of a master card analyzing means, means for feeding master cards to be analyzed by said master card analyzing means, a detail card analyzing means, a supplemental master card analyzing means for analyzing data to be transferred, means for feeding master cards to be analyzed by said supplemental master card analyzing means, a supplemental detail card analyzing means for analyzing data on a detail card transferred from a master card, punching means, means for feeding a detail card past said punching means, a detail card past said detail analyzing means, and a detail card past said supplemental detail card analyzing means, comparing means controlled by the master and detail card analyzing means for comparing the classification data of a pair of master and detail cards for determining their agreement or disagreement, connecting means to connect said punching means to either the supplemental master card analyzing means or the supplemental detail card analyzing means, means controlled by said comparing means when agreement is determined to effect the operation of the feeding means for feeding master cards past said supplemental master card analyzing means, the operation of the detail card feeding means to feed a detail card past said punching means, and through said connecting means cause the punching means under control of the supplemental master card analyzing means to effect the transference of data from the master card to the first detail card, and for causing the operation of the detail card feeding means to feed a following card to said detail card analyzing means, means controlled by said comparing means upon again determining that said following detail card also agrees in classification with a master card of the same classification group for causing the operation of the detail card feeding means to feed a punched card past said supplemental detail card analyzing means and a following detail card past said punching means and the operation of the connecting means to connect said punching means with the supplemental detail card analyzing means to thereby transfer the transferred punched data from a preceding punched detail card to a following detail card.

16. In a machine for comparing master cards with detail cards, the combination of separate means for analyzing detail cards and master cards punched according to one code, two sets of relay storage means comprising detail card storage relays and master card storage relays controlled by the respective analyzing means for concurrently setting up the digit representations in a combination code for each card column analyzed, a plurality of indicating means, settable singly to indicate (1) equality in numerical value of detail and master cards; (2) a lower numerical value of a master card; or (3) a lower numerical value of a detail card; a numeral comparing circuit network for each card column analyzed and comprising for each column interconnected electrical contacts shiftable by said relay storage means, the contacts of the relay storage means of both sets for each code position being so interconnected as to transmit a test impulse to said equality indicating means when coded representations for a detail and master card are alike in each code position, determined by the concurrent energization of master and detail storage relays for each coded representation, and when the code position in any column is unlike, determined by the energization of a detail relay storage means without an accompanying master relay storage means for causing the transfer of the contacts controlled by said detail relay storage means to transfer the test impulse to the second named indicating means, and when the coded representation in any column is unlike, determined by the energization of master relay storage means without an accompanying detail relay storage means for causing the transfer of the contacts controlled by said master relay storage means to transfer the test impulse to the third named indicating means.

17. In a machine for comparing master cards with detail cards, the combination of separate means for analyzing detail cards and master cards punched according to one code, two sets of relay storage means comprising detail card storage relays and master card storage relays controlled by the respective analyzing means for concurrently setting up the digit representations in combination code for each card column analyzed, a plurality of indicating relay means, settable singly to indicate (1) equality in numerical value of detail and master cards; (2) a lower numerical value of a master card; or (3) a lower numerical value of a detail card; a numeral comparing circuit network for each card column analyzed and comprising for each column interconnected electrical contacts shiftable by said relay storage means, the contacts of the relay storage means of both sets for each code position being so interconnected as to transmit a test impulse to said equality indicating means when coded representations for a detail and master card are alike in each code position, determined by the concurrent energization of master and detail storage relays for each code position and when the coded representation in any column is unlike, determined by the energization of a detail relay storage means without an accompanying master relay storage means for causing the transfer of said contacts controlled by the detail relay storage means to transfer the test impulse to the second named indicating means, and when the coded representation in any column is unlike determined by the energization of master relay storage means without an accompanying detail relay storage means for causing the transfer of the contacts controlled by said master relay storage means to transfer the test impulse to the third named indicating means, and means for transmitting an impulse through said network and in accordance with its condition for selectively energizing said relay indicating means.

18. In a machine for comparing master cards with detail cards and selectively feeding master and detail cards, the combination of separate means for analyzing detail cards and master cards punched according to one code, two sets of relay storage means comprising detail card storage relays and master card storage relays controlled by the respective analyzing means for concurrently setting up the digit representations in combination code for each card column analyzed, a plurality of indicating relay means, settable singly to indicate (1) equality in numerical value of detail and master cards; (2) a lower numerical value of a master card; or (3) a lower numerical value of a detail card; a numeral comparing circuit network for each card column analyzed and comprising interconnected electrical contacts shiftable by said relay storage means, the contacts of the relay storage means of both sets for each code position being so interconnected as to transmit a test impulse to said equality indicating means when coded representations for a detail and master card are alike in each code position, determined by the concurrent energization of master and detail storage relays for each code position, and when the coded representation in any column is unlike, determined by the energization of a detail relay storage means without an accompanying master relay storage means for causing the transfer of the contacts controlled by said detail relay storage means to transfer said test impulse to the second named indicating means, and when the coded representation in any column is unlike, determined by the energization of master relay storage means without an accompanying detail relay storage means for causing the transfer of the contacts controlled by said master relay storage means to transfer said test impulse to the third named indicating means, a detail card feeding means, a master card feeding means, means for transmitting an impulse through said network to said relay indicating means and in accordance with the condition of the network to selectively energize said relay indicating means, means controlled jointly by said equality indicating relay means and the (3) relay indicating means indicating a lower numerical value of the detail card for causing the operation of the detail card feeding means, and means controlled by the (2) relay indicating means indicating a lower numerical value of the master card for causing the operation of the master card feeding means.

19. In a recording machine, the combination of punching means of the type for punching a card column by column, means for sensing master cards, digit storage devices controlled by said master card sensing means for storing up digit representations, means for sensing detail cards, digit storage devices controlled by said detail card sensing means for setting up digit representations of the detail cards, supplemental sensing means for said master cards, separate means for retaining detail and master digit storage devices set up, separate means for feeding master cards past the related sensing means and past the supplemental sensing means, means for feeding detail cards past said sensing means and said punching means, means controlled by the digit storage devices for comparing the classification data of master and detail cards, means controlled by the comparing means for causing upon the determination of a particular classification data relationship between sensed master and detail cards the operation of the feeding means to feed the master card past said supplemental master card sensing means and the compared detail card concurrently past said punching means to transfer data on the master card column by column to the detail card, and for causing operation of the detail card feeding means to feed the next detail card past the first mentioned detail card sensing means, and means controlled by said detail card feeding means for disabling the means for retaining the digit set up on the detail digit storage devices, whereby the latter are normalized to be set up to represent the digits of said next detail card.

20. In a card punching machine, the combination of a master card analyzing means, detail card analyzing means, a supplemental master card analyzing means for analyzing data to be transferred, detail card digit storage devices set up by the detail card analyzing means, master card digit storage devices set up under control of said master card analyzing means, separate means for retaining the aforementioned digit storage devices set up, comparing means controlled by the aforesaid master and detail card digit storage devices for comparing the classification data of a pair of master and detail cards for determining their agreement or whether a detail card is lower in classification data or whether a master card is lower in classification data, punching means of the type for punching a card column by column, means controlled by said comparing means when an agreement is determined to effect the operation of the punching means under control of the supplemental master card analyzing means to effect the transference of data from the master card column by column to the detail card, and for causing the feeding of the next detail card to the detail card analyzing means, and for disabling the means for retaining the detail card storage devices set up, whereby the latter may be set under control of the data on the said next detail card, means controlled by said comparing means upon determining that a following detail card is lower in classification data for causing the feeding of the next detail card to the detail card analyzing means and for disabling the retaining means for the detail card digit storage devices to clear them of their previous digit representations whereby the latter are set up in accordance with the data on the said next detail card for comparison with the retained setup of the master card digit storage devices, or upon determining that the master card is lower in classification data for causing the feeding of a master card to the first mentioned analyzing means, and for disabling the retaining means for the master card digit storage devices to clear them of their digit representations whereby the latter are set up under control of the next master card for comparison with the retained setup of the detail card digit storage devices.

21. In a machine of the class described, means for analyzing and comparing classification data of a master record with each of a series of detail records, supplemental means for analyzing other data on said master record; punching mechanism for reproducing said other data on the series of detail records, means controlled by said comparing means upon determining a predetermined relationship in classification data of a compared master record and a first detail record to effect the operation of said punching mechanism under control of said supplemental master card analyzing means to reproduce said other data on the first detail record, and means operable upon determining the same predetermined relationship between each successive detail record and the master record to effect the operation of said punching mechanism to punch each successive detail record under control of the preceding punched detail record.

22. In a machine of the class described, means for comparing classification data of a master record with each of a series of detail records, means controlled by said comparing means for reproducing other data on the master record upon the first of series of detail records upon ascertaining a predetermined relationship in classification data between the master record and said first detail record, and means operable upon ascertaining that each successive detail record bears said predetermined relationship to said master record for effecting the reproduction of said other data on each successive detail record under control of the preceding punched detail record.

23. In a machine of the class described, means for comparing classification data on a master record with each of a series of detail records, means controlled by said comparing means for reproducing other data with master record upon the first of a series of detail records upon ascertaining agreement in classification data between the master record and said first detail record, and means operable upon ascertaining agreement in classification data between said master record and each successive detail record to cause reproduction of said other data on each successive detail record under control of the preceding punched detail record.

24. In a machine of the class described, detail card punching mechanism, means for comparing classification data of a master card with each of a series of detail cards and for causing upon agreement between the first detail card and the master card the operation of said detail card punching mechanism under control of said master card to reproduce other data thereon the detail card, and means for thereafter causing upon agreement of the master card and each successive detail card said detail card punching mechanism to be controlled by each punched detail card of a series to thereby punch each following detail card under control of each preceding punched detail card to represent said other data initially derived from the master card.

25. In a machine of the class described, separate means for analyzing a pair of records perforated to represent characters in one code, a set of relays for each record, means controlled by the respective analyzing means for selectively energizing the relays of each set in combinations to represent the character on the record in another different code, an electrical character comparing circuit network including relay contacts controlled by said sets of relays for determining the relationship of characters, and means controlled thereby for completing one of said circuits when the characters on compared records are alike, the second circuit when a character on one record is higher in the scale than the compared character on the other record, and the third circuit when a character on said first one record is lower in the scale than the compared character on said other record.

26. In a machine of the class described, separate means for analyzing a pair of records perforated to represent numerals in one code, a set of relays for each record, the number of relays in each set corresponding to the number of code positions of another code, means controlled by the respective analyzing means for selectively energizing the relays of each set in combinations to represent the numeral on the record in said other code, an electrical numeral comparing circuit network including relay contacts controlled by said sets of relays for determining the relationship of compared numerals, and means controlled thereby for completing one of said circuits when the numerals represented on compared records are alike, the second circuit when a numeral represented on one record is higher in digital value than the compared numeral represented on the other record, and the third circuit when a numeral represented on said first one record is lower in digital value than the compared numeral represented on said other record.

27. In a machine for comparing master cards with detail cards, the combination of separate means for analyzing a detail card and a master card punched to represent characters in one code, sets of relays comprising a set of detail relays and a set of master relays, the number of relays in each set corresponding to the code positions of another code, means controlled by the respective analyzing means for selectively energizing said relays in predetermined combinations to represent said characters in said other code, a plurality of means (1) (2) (3) settable to represent (1) equality in character representation of detail and master cards; (2) a lower character representation of a master card; or (3) a lower character representation of a detail card, and a character comparing circuit network for determining the relationship of compared characters comprising interconnected relay contacts positionable by said master and detail relays, the contacts controlled by the master and detail relays at each code position being so interconnected as to complete through relay contacts concurrently positioned by the energization of the master and detail relays at a common code position one circuit to said equality representing means when character representations on a detail and a master card are alike, to complete through contacts positioned by the energization of a detail relay without an accompanying master relay in a common code position another circuit to the second named indicating means when the character represented on the master card relative to the detail card is lower, and complete through contacts positioned by the energization of master relay without an accompanying detail relay in a common code position a third circuit to the third named representing means when the character represented on the detail card is relative to the master card lower.

28. In a machine for comparing master cards with detail cards, the combination of separate means for analyzing a detail card and a master card punched to represent characters in one code, sets of relays comprising a set of detail relays and a set of master relays, the number of relays in each set corresponding to the code positions of another code, means controlled by the respective analyzing means for selectively energizing said relays in predetermined combinations to represent said characters in said other code, a character comparing circuit network for determining the relationship of compared characters comprising interconnected relay contacts positionable by said master and detail relays, and means controlled thereby to complete one circuit through relay contacts concurrently positioned by the energization of the master and detail relays at a common code position when compared character representations on a detail and a master card are alike, to complete a second circuit through contacts positioned by the energization of a detail relay without an accompanying master relay in a common code position when the character represented on the master card is lower than the compared character on the detail card, and to complete a third circuit through contacts positioned by the energization of master relay without an accompanying detail relay in a common code position when the character represented on the detail card is lower than the compared character on the master card.

29. In a machine for effecting the selective reproduction of data derived from master records upon detail records, wherein said records are arranged in a predetermined serial order, means for analyzing classification data on said master and detail records, supplemental means for analyzing other data on the master records to be reproduced on said detail records, means for feeding master records past the master record analyzing means to analyze classification data, and a leading master record, if one, concurrently past said supplemental master record analyzing means to analyze both records in motion, a detail record punching mechanism, means for feeding a detail record past the detail record analyzing means to analyze classification data on a detail record concurrently with the analysis of classification data on a compared master record, and for feeding a leading detail record, if one, past said punching mechanism concurrently with the passage of a master record past the supplemental analyzing means to cause reproduction on the detail record of said other data while both records are being fed, comparing means controlled by the first named analyzing means for determining the relationship of classification data on compared master and detail records, and means controlled thereby for causing upon determination of a predetermined relationship of compared master and detail records the operation of said detail record punching mechanism under control of the supplemental master record analyzing means.

30. In a machine for effecting the selective reproduction of data derived from master records upon detail records, wherein said records are arranged in a predetermined serial order sequence, means for analyzing serial order representations on said master and detail records, supplemental means for analyzing other data on the master records to be reproduced on said detail records, means for feeding master records past the master record analyzing means to analyze the serial order representation, and a leading master record, if one, concurrently past said supplemental master record analyzing means to analyze both records in motion, a detail record punching mechanism, means for feeding a detail record past the detail record analyzing means to analyze the serial order representation on a detail record concurrently with the analysis of the serial order representation on a compared master record, and for feeding a leading detail record, if one, past said punching mechanism concurrently with the passage of a master record past the supplemental analyzing means to cause reproduction on the detail record of said other data while both records are being fed, comparing means controlled by the first named analyzing means for determining the relationship of serial order representations on compared master and detail records, means controlled thereby for causing upon determination of identity in serial order representation of compared master and detail records the operation of said detail record punching mechanism under control of the supplemental master record analyzing means and the operation of the detail and master record feeding means to feed the detail record to be punched as the master record is analyzed by the master record analyzing means, and to feed new detail and master records to the analyzing means which analyzes the serial order representations, and means controlled by said comparing means upon determination of a lower serial order representation of a record when records are in an ascending serial order sequence to effect the selective feeding of either the master or detail records whichever is lower by the selective operation of the associated feeding means until either a master or detail record is analyzed which represents identity.

31. In a machine for effecting the selective reproduction of data derived from master records upon detail records, wherein said records are arranged in a predetermined serial order sequence, means for analyzing serial order representations on said master and detail records, supplemental means for analyzing other data on the master records to be reproduced on said detail records, means for feeding master records past the master record analyzing means to analyze the serial order representations, and a leading master record, if one, concurrently past said supplemental master record analyzing means to analyze both records in motion, a detail record punching mechanism, means for feeding a detail record past the detail record analyzing means to analyze the serial order representation on a detail record concurrently with the analysis of the serial order representation on a compared master record, and for feeding a leading detail record, if one, past said punching mechanism concurrently with the passage of a master record past the supplemental analyzing means to cause reproduction on the detail record of said other data while both records are being fed, comparing means controlled by the first named analyzing means for determining the relationship of the serial order representation on compared master and detail records, means controlled thereby for causing upon determination of identity in serial order representation of compared master and detail records the operation of said detail record punching mechanism under control of the supplemental master record analyzing means and the operation of the detail and master record feeding means to feed the detail record to be punched as the master record is analyzed by the supplemental master record analyzing means, and to feed new detail and master records to the analyzing means which analyzes their serial order representations, means controlled by said comparing means upon determining that the master record has a lower serial order representation for causing the operation of the master record feeding means to feed a new master card for analysis of its serial order representation, and for causing the operation of the feeding means to feed a leading detail record, if one, past the detail record punching mechanism concurrently with feeding of a master record past the supplemental master record analyzing means, and other means controlled by said comparing means upon determining that the detail record has a lower serial order representation to effect the operation of the detail record feeding means to feed a new detail record to the analyzing means which analyzes its serial order representation for comparison with the master card.

32. In a machine for effecting the selective reproduction of data derived from master records upon detail records, wherein said records are arranged in a predetermined serial order sequence, means for analyzing serial order representations on said master and detail records, serial order representation storage setup means for the detail and master records, supplemental means for analyzing other data on the master records to be reproduced on said detail records, means for feeding master records past the master record analyzing means to analyze serial order representations to set up the related storage setup means while the record is in motion and a leading master record, if one, concurrently past said supplemental master record analyzing means to analyze both records in motion, a detail record punching mechanism, means for feeding a detail record past the detail record analyzing means to analyze the serial order representation on a detail record to set up the related storage setup means while the record is in motion concurrently with the analysis of the serial order representation on a compared master record, and for feeding a leading detail record, if one, past said punching mechanism concurrently with the passage of a master record past the master record supplemental analyzing means to cause reproduction on the detail record of said other data while both records are in motion, comparing means controlled by the master and detail storage setup means for determining the relationship of the serial order representation on compared master and detail records, and means controlled thereby for causing upon determination of an identity in serial order representation of compared master and detail records the operation of said detail record punching mechanism under control of the supplemental master record analyzing means, the operation of means to clear the master and detail storage setup means of their representations, and the operation of the feeding means to feed a new detail record and a new master record past the related analyzing means which analyzes their serial order representations.

33. In a machine for effecting the selective reproduction of data derived from master records upon detail records, wherein said records are arranged in a predetermined serial order sequence, means for analyzing serial order representations on said master and detail records, serial order representation storage setup means for the detail and master records, supplemental means for analyzing other data on the master records to be reproduced on said detail records, means for feeding master records past the master record analyzing means to analyze serial order representations to set up the related storage setup means while the record is in motion, and a leading master record, if one, concurrently past said supplemental master record analyzing means to analyze both records in motion, a detail record punching mechanism, means for feeding a detail record past the detail record analyzing means to analyze the serial order representation on a detail record to set up the related storage setup means while the record is in motion concurrently with the analysis of the serial order representation on a compared master record, and for feeding a leading detail record, if one, past said punching mechanism concurrently with the passage of a master record past the master record supplemental analyzing means to cause reproduction on the detail record of said other data while both records are in motion, comparing means controlled by the master and detail storage setup means for determining the relationship of the serial order representation on compared master and detail records, means controlled thereby for causing upon determination of an identity in serial order representation of compared master and detail records the operation of said detail record punching mechanism under control of the supplemental master record analyzing means, the operation of means to clear the master and detail storage setup means of their representations, and the operation of the detail and master record feeding means to feed the detail record to be punched as the master record is analyzed by the supplemental master record analyzing means, and to feed new detail and master records to the related analyzing means which analyzes their serial order representations, means controlled by said comparing means upon determining that the master record has a lower serial order representation for causing the operation of the master record feeding means to the analyzing means which analyzes its serial order representation, for causing the master record storage setup means to be cleared of its serial order representation, and for causing the operation of the feeding means to feed a leading detail record, if one, past the detail record punching mechanism concurrently with feeding of a master record past the supplemental master record analyzing means, and other means controlled by said comparing means upon determining that the detail record has a lower serial order representation to clear the detail record storage setup means of its representation, and to effect the operation of the detail record feeding means to feed a new detail record to the analyzing means which analyzes its serial order representation for a new setup of the detail record storage setup means.

34. In a machine for effecting the selective reproduction of data derived from master records upon detail records, wherein said records are arranged in a predetermined serial order, means for analyzing classification data on said master and detail records, supplemental means for analyzing other data on the master records to be reproduced on said detail records, means for feeding master records past the master record analyzing means to analyze the classification data, and a leading master record, if one, concurrently past said supplemental master record analyzing means to analyze both records in motion, a detail record punching mechanism, means for feeding a detail record past the detail record analyzing means to analyze classification data on a detail record concurrently with the analysis of classification data on a compared master record, and for feeding a leading detail record, if one, past said punching mechanism concurrently with the passage of a master record past the supplemental analyzing means to cause reproduction on the detail record of said other data while both records are being fed, comparing means controlled by the first named analyzing means for determining the relationship of classification data on compared master and detail records, means controlled thereby for causing upon determination of a predetermined relationship of a compared master record and a first detail record of a series the operation of said detail record punching mechanism under control of the supplemental master record analyzing means, supplemental detail record analyzing means for analyzing said other data punched on a leading detail record of a series, and means controlled by said comparing means upon determination of a predetermined relationship of a compared master record and each detail record after the first for causing the feeding of a leading detail record past said punching mechanism and a preceding punched detail record concurrently past the supplemental detail record analyzing means, and for effecting the operation of the punching mechanism under control of the supplemental detail record analyzing means while both detail records are in motion.

35. In a machine for selectively reproducing data on detail records derived from master records, a record analyzing station comprising means for analyzing serial order representations on master records, and other means for analyzing serial order representations on detail records, a supplemental master record analyzing station comprising means for analyzing other data on a master record to be reproduced on detail records, means for comparing serial order representations of a master and a detail record to ascertain a predetermined relationship, and means controlled thereby upon ascertaining said predetermined relationship to feed said master record to said supplemental master record analyzing station and under control of the analyzing means thereat effect the reproduction on said detail record of said other data derived from said master record.

36. In a machine for selectively reproducing data on detail records derived from master records, a record analyzing station comprising means for analyzing serial order representations on master records, and other means for analyzing serial order representations on detail records, a supplemental master record analyzing station comprising means for analyzing other data on a master record to be reproduced on detail records, means for comparing serial order representations of a master and a detail record to ascertain the relationship of the serial order representations, means controlled thereby upon ascertaining a predetermined relationship in the serial order representations of compared master and detail records to feed said master record to said supplemental master record analyzing station and under control of the analyzing means thereat to effect the reproduction on said detail record of said other data derived from said master record, and means controlled by said comparing means upon ascertaining either of two different relationships in serial order representations of compared master and detail records to selectively feed master and detail records to said first record analyzing station until said predetermined relationship is ascertained.

37. In a machine for selectively reproducing data on detail records derived from master records, a record analyzing station comprising means for analyzing serial order representations on master records, and other means for analyzing serial order represenations on detail records, a supplemental master record analyzing station comprising means for analyzing other data on a master record to be reproduced on detail records, a detail record punching means, means for comparing serial order representations of a master and a detail record to ascertain a predetermined relationship in serial order representations, and means controlled thereby upon ascertaining said predetermined relationship to feed said detail record to said detail record punching means, said master record to said supplemental master record analyzing station and under control of the analyzing means thereat to cause said punching means to effect the reproduction on said detail record of said other data derived from said master record.

RALPH E. PAGE.
HORACE S. BEATTIE.

CERTIFICATE OF CORRECTION.

Patent No. 2,372,909. April 3, 1945.

RALPH E. PAGE, ET AL.

It is hereby certified that error appears in the printed specification of the above numbered patent requiring correction as follows: Page 16, first column, line 56, claim 24, after "thereon" insert --on--; and that the said Letters Patent should be read with this correction therein that the same may conform to the record of the case in the Patent Office.

Signed and sealed this 31st day of July, A. D. 1945.

Leslie Frazer (Seal) Acting Commissioner of Patents.